United States Patent
Cha et al.

(10) Patent No.: US 12,556,247 B2
(45) Date of Patent: Feb. 17, 2026

(54) ELECTRONIC DEVICE AND METHOD FOR SETTING, BY ELECTRONIC DEVICE, PATH OF TRANSMISSION SIGNAL

(71) Applicant: SAMSUNG ELECTRONICS CO., LTD., Suwon-si (KR)

(72) Inventors: Jaemoon Cha, Suwon-si (KR); Jimin Koo, Suwon-si (KR); Jaewoo Park, Suwon-si (KR); Seongju Lee, Suwon-si (KR); Yeonjoo Lee, Suwon-si (KR); Hyeyong Go, Suwon-si (KR); Yeongseob Lim, Suwon-si (KR); Kyujae Jang, Suwon-si (KR); Sungyoul Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 416 days.

(21) Appl. No.: 18/115,250

(22) Filed: Feb. 28, 2023

(65) Prior Publication Data
US 2023/0208483 A1    Jun. 29, 2023

Related U.S. Application Data

(63) Continuation of application No. PCT/KR2021/011618, filed on Aug. 30, 2021.

(30) Foreign Application Priority Data

Aug. 31, 2021 (KR) .................. 10-2020-0110560

(51) Int. Cl.
H04B 7/06    (2006.01)
H04B 1/3827    (2015.01)
(Continued)

(52) U.S. Cl.
CPC ......... *H04B 7/0608* (2013.01); *H04B 1/3838* (2013.01); *H04W 52/245* (2013.01); *H04W 52/367* (2013.01)

(58) Field of Classification Search
CPC ...... H01Q 25/00; H04W 52/52; H04W 88/02; H04W 52/367; H04W 52/242;
(Continued)

(56) References Cited

U.S. PATENT DOCUMENTS 9,544,934 B2    1/2017 Liu et al.
2006/0040619 A1    2/2006 Cho et al.
(Continued)

FOREIGN PATENT DOCUMENTS

CN    1499867    5/2004
CN    101873683 A    10/2010
(Continued)

OTHER PUBLICATIONS

Search Report and Written Opinion dated Dec. 27, 2022 issued in International Patent Application No. PCT/KR2021/011618.
(Continued)

*Primary Examiner* — Tu X Nguyen
(74) *Attorney, Agent, or Firm* — NIXON & VANDERHYE P.C.

(57) ABSTRACT

According to various embodiments, an electronic device comprises: a communication processor; at least one radio frequency integrated circuit (RFIC) connected to the communication processor; and a plurality of antennas, each of which is connected to the at least one RFIC through at least one radio frequency front-end (RFFE) circuit and configured to transmit a signal corresponding to at least one communication network, wherein the communication processor may identify information related to strength of a reception signal received through each of the plurality of antennas,
(Continued)

identify the maximum transmittable power set corresponding to a transmission path for each of the plurality of antennas, and control the electronic device such that a transmission signal to be transmitted through at least one antenna selected from among the plurality of antennas at least based on the identified information related to the strength of the reception signal and maximum transmittable power.

20 Claims, 18 Drawing Sheets

(51) Int. Cl.
*H04W 52/24* (2009.01)
*H04W 52/36* (2009.01)

(58) Field of Classification Search
CPC . H04W 52/245; H04W 48/12; H04W 52/283; H04W 36/326; H04W 36/00698; H04W 36/14; H04W 56/0095
See application file for complete search history.

(56) References Cited

U.S. PATENT DOCUMENTS

| | | | |
|---|---|---|---|
| 2011/0105059 A1 | 5/2011 | Gaal et al. | |
| 2014/0162574 A1 | 6/2014 | Rousu et al. | |
| 2014/0233665 A1 | 8/2014 | Clevorn et al. | |
| 2014/0307570 A1 | 10/2014 | Hong | |
| 2014/0341125 A1 | 11/2014 | Dayal et al. | |
| 2016/0126993 A1 | 5/2016 | Wloczysiak | |
| 2016/0173172 A1 | 6/2016 | Greene | |
| 2016/0174293 A1 | 6/2016 | Mow et al. | |
| 2017/0244456 A1 | 8/2017 | Kim et al. | |
| 2018/0323947 A1* | 11/2018 | Brunel | H04L 5/1469 |
| 2019/0132033 A1 | 5/2019 | Akkarakaran et al. | |
| 2019/0215765 A1* | 7/2019 | Ramasamy | H04W 52/243 |
| 2020/0144730 A1 | 5/2020 | Desclos et al. | |
| 2020/0374804 A1 | 11/2020 | Mukkavilli et al. | |
| 2021/0218158 A1 | 7/2021 | Kim et al. | |

FOREIGN PATENT DOCUMENTS

| | | |
|---|---|---|
| CN | 103312395 | 9/2013 |
| EP | 3442077 | 2/2019 |
| JP | 3131967 | 2/2001 |
| JP | 2006-033731 | 2/2006 |
| JP | 2008-236055 | 10/2008 |
| KR | 10-2005-0020133 | 3/2005 |
| KR | 10-2014-0122471 | 10/2014 |
| KR | 10-1489676 | 2/2015 |
| KR | 10-2016-0010463 | 1/2016 |
| KR | 10-1737231 | 5/2017 |
| KR | 10-2017-0115870 | 10/2017 |
| KR | 10-2018-0036945 | 4/2018 |
| KR | 10-2019-0090322 | 8/2019 |
| KR | 10-2020-0078505 | 7/2020 |
| KR | 10-2021-0141229 | 11/2021 |
| KR | 10-2022-0011635 | 1/2022 |
| WO | 2013/135872 | 9/2013 |
| WO | 2021/203348 | 10/2021 |

OTHER PUBLICATIONS

Korean Office Action issued Mar. 11, 2024 in corresponding Korean Patent Application No. 10-2020-0110560.
Chinese Office Action issued Oct. 18, 2024 in corresponding Chinese Patent Application No. 202180053717.0.
Chinese Office Action issued Mar. 20, 2025 in corresponding Chinese Patent Application No. 202180053717.0.
Extended European Search Report dated Jan. 19, 2024 issued in European Patent Application No. 21862151.4.

* cited by examiner

ELECTRONIC DEVICE AND METHOD FOR SETTING, BY ELECTRONIC DEVICE, PATH OF TRANSMISSION SIGNAL

CROSS-REFERENCE TO RELATED APPLICATIONS

This application is a continuation of International Application No. PCT/KR2021/011618 designating the United States, filed on Aug. 30, 2021, in the Korean Intellectual Property Receiving Office and claiming priority to Korean Patent Application No. 10-2020-0110560, filed on Aug. 31, 2020, in the Korean Intellectual Property Office, the disclosures of which are incorporated by reference herein in their entireties.

BACKGROUND

Field

The disclosure relates to an electronic device and a method for configuring the path of a transmission signal in an electronic device.

Description of Related Art

Recent development of mobile communication technologies has been followed by widespread use of portable terminals that provide various functions, and there have been efforts to develop 5G communication systems in order to satisfy ever-increasing demands for wireless data traffic. In order to accomplish high data transmission rates and to provide faster data transmission speeds, it has been considered to implement 5G communication systems in a higher frequency band (for example, 25-60 GHz band) in addition to the frequency bands used in 3G communication systems and long-term evolution (LTE) communication systems.

For example, in order to alleviate radio wave path loss in mmWave bands and to increase the radio wave propagation distance, there has been discussion on technologies, in 5G communication systems, regarding beamforming, massive MIMO, full dimensional MIMO (FD-MIMO), array antenna, analog beam-forming, and large scale antenna.

In order to transmit signals from an electronic device to a communication network (for example, base station), data generated by a processor or a communication processor inside the electronic device may undergo signal processing through a radio frequency integrated circuit (RFIC) and a radio frequency front end (RFFE) and may then be transmitted to the outside of the electronic device through at least one antenna.

An electronic device may provide multiple transmission paths (Tx paths) in order to transmit signals to a communication network (for example, base station). The multiple Tx paths provided by the electronic device may include an RFIC and/or RFFE circuit for each path. In addition, each RFFE circuit may be connected to one antenna or multiple antennas, and the multiple Tx paths may thus been divided into multiple antenna Tx paths corresponding to the one or multiple antennas.

The multiple antenna Tx paths may have different path losses occurring because respective Tx paths have different lengths, and different components are disposed on the corresponding Tx paths. In addition, since respective antennas corresponding to respective antenna Tx paths are disposed in different positions on the electronic device, different antenna losses may occur. Therefore, if a Tx antenna or Tx path is configured by considering only the difference in received signal strength (for example, reference signal received power (PSRP)) for each path, a Tx path or antenna that transmits a relatively small magnitude of Tx power may be configured, because the power actually radiated through the antenna (for example, radiation power) is not considered.

For example, when only the difference in reference signal received power (PSRP) between signals received through respective paths is considered when configuring a Tx path, a Tx path or antenna having a relatively low level of radiation power may be configured to transmit Tx signals. In addition, when Tx/Rx imbalance following the configuration of an antenna tuning circuit corresponding to each antenna is not considered when configuring a Tx path, there may occur a case of switching to another Tx path although radiation power of the current Tx path is good, or a situation in which no Tx path switching occurs although radiation power of the current Tx path is bad.

SUMMARY

Embodiments of the disclosure may provide an electronic device and a method for configuring a Tx signal path in an electronic device, wherein, when a Tx signal is transmitted in an electronic device including multiple antenna Tx paths, an optimal Tx path may be configured by determining a Tx path or whether to switch antennas by considering the received signal strength and Tx max power with regard to each Tx path.

Embodiments of the disclosure may provide an electronic device and a method for configuring a Tx signal path in an electronic device, wherein, when a Tx signal is transmitted in an electronic device including multiple antenna Tx paths, an optimal Tx path may be configured by determining a Tx path or whether to switch antennas by considering the received signal strength with regard to each Tx path and the Tx/Rx imbalance of each antenna.

According to various example embodiments, an electronic device may include: a communication processor, at least one radio frequency integrated circuit (RFIC) connected to the communication processor, and a plurality of antennas, each of which is connected to the at least one RFIC through at least one radio frequency front-end (RFFE) circuit and configured to transmit a signal corresponding to at least one communication network, wherein the communication processor is configured to: identify information related to strength of a reception signal received through each of the plurality of antennas, identify maximum transmittable power set corresponding to a transmission path for each of the plurality of antennas, and control the electronic device to transmit a transmission signal through at least one antenna among the plurality of antennas, wherein the at least one antenna is selected at least based on the identified information related to the strength of the reception signal and the maximum transmittable power.

According to various example embodiments, an electronic device may include: a communication processor, at least one radio frequency integrated circuit (RFIC) connected to the communication processor, and a plurality of antennas, each of which is connected to the at least one RFIC through at least one radio frequency front-end (RFFE) circuit and configured to transmit a signal corresponding to at least one communication network, wherein the communication processor is configured to: identify information related to strength of a reception signal received through each of the plurality of antennas, identify a configured value of an antenna tuning circuit corresponding to an antenna transmitting a transmission signal among the plurality of antennas, and control the electronic device to transmit a transmission signal through at least one antenna among the plurality of antennas, wherein the at least one antenna is selected at least based on the identified information related to the strength of the reception signal and the identified configured value of the antenna tuning circuit.

According to various example embodiments, a method for configuring a transmission path by an electronic device, the method including: identifying information related to strength of a reception signal received through each of plurality of antennas, wherein the electronic device includes a communication processor, at least one radio frequency integrated circuit (RFIC) connected to the communication processor, and a plurality of antennas, each of which is connected to the at least one RFIC through at least one radio frequency front-end (RFFE) circuit and configured to transmit a signal corresponding to at least one communication network, identifying maximum transmittable power set corresponding to a transmission path for each of the plurality of antennas, and transmitting a transmission signal through at least one antenna among the plurality of antennas, wherein the at least one antenna is selected at least based on the identified information related to the strength of the reception signal and the maximum transmittable power.

According to various example embodiments, in an electronic device providing multiple antenna Tx paths, an optimal Tx path that maximizes power actually radiated through antenna may be configured by further considering Tx max power and/or Tx/Rx imbalance of an antenna tuning circuit in addition to the received signal strength with regard to each Tx path.

Accordingly, even in a situation with a bad field state, the probability of maintaining connection between a base station and a terminal may be improved compared with a conventional Tx path configuration method which considers only the received signal strength, and signals may be transmitted in a modulation type having a relatively high level of radiation power and high performance, thereby having high Uplink T-Put.

In addition, according to various example embodiments, when a high level of Tx path loss occurs as a result of antenna configuration, the Tx path may be switched such that the antenna loss of the Tx signal is reduced, thereby reducing current consumption.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
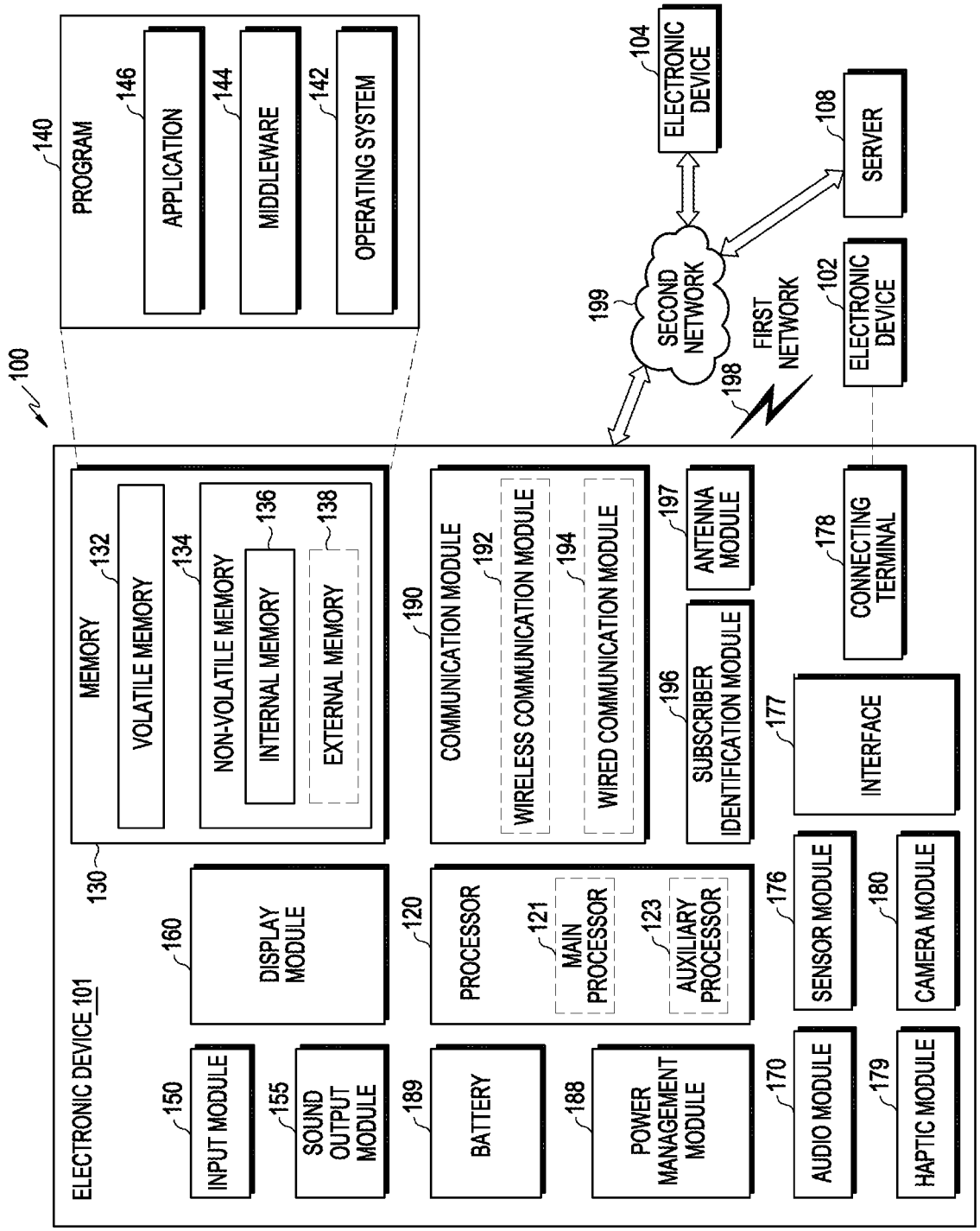
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
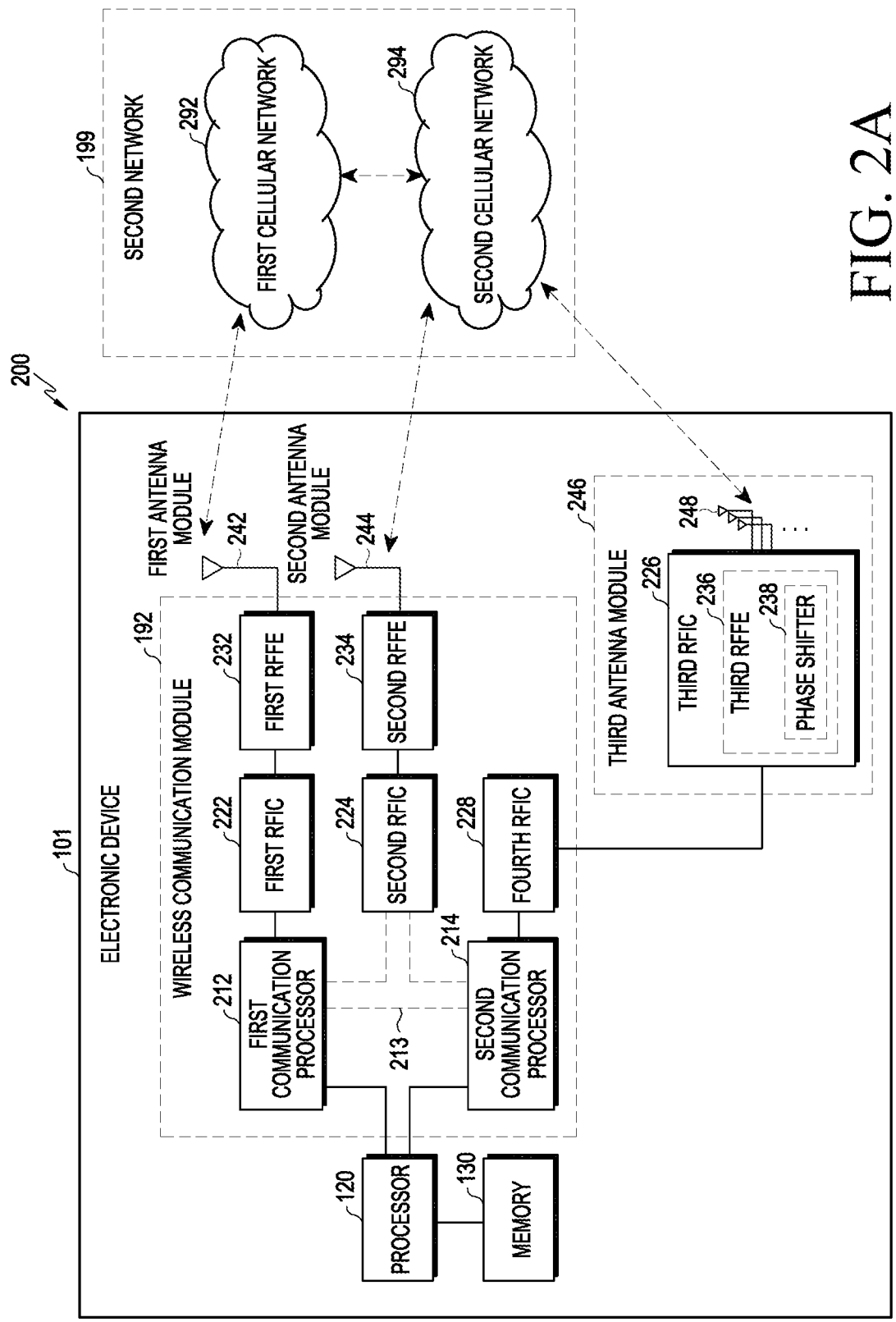
FIG. 2A is a block diagram illustrating an example configuration of an electronic device for supporting legacy network communication and 5G network communication according to various embodiments.

FIG. 2A is a block diagram 200 illustrating an example configuration of the electronic device 101 for supporting legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, and a third RFIC 226, a fourth RFIC 228, a first radio frequency front end (RFFE) 232, a second RFFE 234, a first antenna module (e.g., including at least one antenna) 242, a second antenna module (e.g., including at least one antenna) 244, a third antenna module (e.g., including at least one antenna) 246, and antennas 248. The electronic device 101 may further include a processor (e.g., including processing circuitry) 120 and a memory 130. The second network 199 may include a first cellular network 292 and a second cellular network 294. According to an embodiment, the electronic device 101 may further include at least one of the components illustrated in FIG. 1, and the second network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least a portion of the wireless communication module 192. According to an embodiment, the fourth RFIC 228 may be omitted or included as part of the third RFIC 226.

The first communication processor 212 may include various communication circuitry and establish a communication channel of a band to be used for wireless communication with the first cellular network 292 and support legacy network communication through the established communication channel. According to various embodiments, the first cellular network may be a legacy network including a second generation (2G), 3G, 4G, or long-term evolution (LTE) network. The second communication processor 214 may include various communication circuitry and establish a communication channel corresponding to a designated band (e.g., about 6 GHz to about 60 GHz) among bands to be used for wireless communication with the second cellular network 294, and support a 5G network through the established communication channel. According to various embodiments, the second cellular network 294 may be a 5G network defined by 3GPP. Additionally, according to an embodiment, the first communication processor 212 or the second communication processor 214 may establish a communication channel corresponding to another designated band (e.g., about 6 GHz or less) among bands to be used for wireless communication with the second cellular network 294, and support 5G network communication through the established communication channel.

The first communication processor 212 may transmit and receive data to and from the second communication processor 214. For example, data classified as to be transmitted through the second cellular network 294 may be transmitted through the first cellular network 292. In this case, the first communication processor 212 may receive transmission data from the second communication processor 214. For example, the first communication processor 212 may transmit and receive data through an interface 213 between the first communication processor 212 and the second communication processor 214. The interface 213 between the processors may be implemented as, for example, a universal asynchronous receiver/transmitter (UART) (e.g., high speed-UART (HS-UART) or a peripheral component interconnect bus express (PCIe) interface), but the type is no limit thereto. Alternatively, the first communication processor 212 and the second communication processor 214 may exchange control information and packet data information using, for example, a shared memory. The first communication processor 212 may transmit and receive various types of information, such as sensing information, information on output strength, and resource block (RB) allocation information, to and from the second communication processor 214.

Depending on the implementation, the first communications processor 212 may not be directly connected to the second communications processor 214. In this case, the first communication processor 212 may transmit and receive data to and from the second communication processor 214 through the processor 120 (e.g., an application processor). For example, the first communication processor 212 and the second communication processor 214 may transmit and receive data through the processor 120 (e.g., an application processor) and an HS-UART interface or a PCIe interface, but the type of the interface is not limited thereto. Alternatively, the first communication processor 212 and the second communication processor 214 may exchange control information and packet data information using the processor 120 (e.g., an application processor) and a shared memory.

Figure 2B:
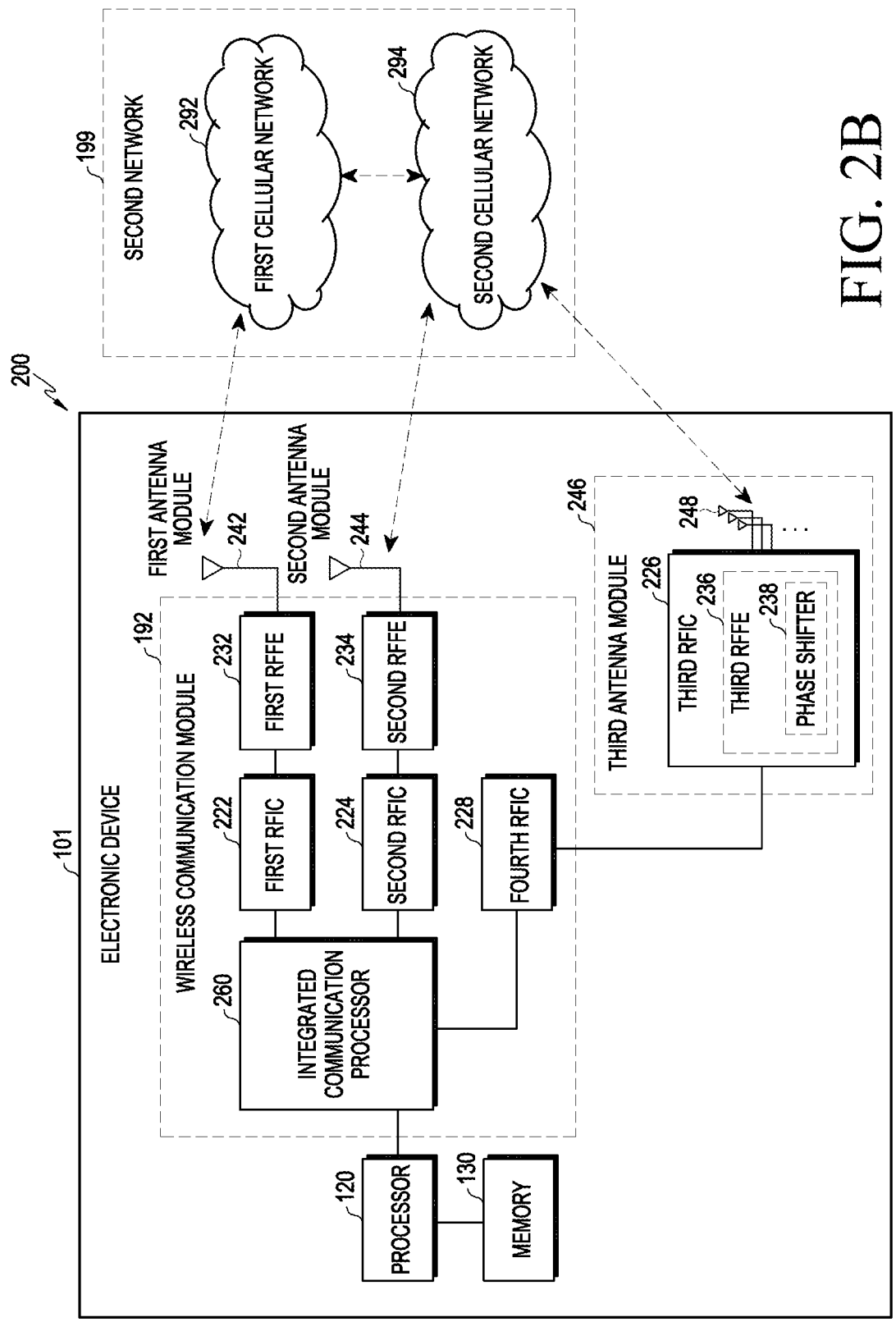
FIG. 2B is a block diagram illustrating an example configuration of an electronic device for supporting legacy network communication and 5G network communication according to various embodiments.

According to an embodiment, the first communication processor 212 and the second communication processor 214 may be implemented in a single chip or a single package. According to various embodiments, the first communication processor 212 or the second communication processor 214 may be formed in a single chip or single package with the processor 120, a coprocessor 123, or a communication module 190. For example, as shown in FIG. 2B, the unified communications processor 260 may support functions for communication with both the first cellular network 292 and the second cellular network 294.

During transmission, the first RFIC 222 may convert a baseband signal generated by the first communication processor 212 into a radio frequency (RF) signal of about 700 MHz to about 3 GHz to be used in the first cellular network 292 (e.g., a legacy network). During reception, an RF signal may be acquired from the first network 292 (e.g., a legacy network) via an antenna (e.g., the first antenna module 242)

and may be preprocessed via an RFFE (e.g., the first RFFE 232). The first RFIC 222 may convert the preprocessed RF signal into a baseband signal such that the signal can be processed by the first communication processor 212.

During transmission, the second RFIC 224 may convert a baseband signal generated by the first communication processor 212 or the second communication processor 214 into an RF signal (hereinafter referred to as a 5G Sub6 RF signal) of a Sub6 band (e.g., about 6 GHz or less) to be used in the second cellular network 294 (e.g., a 5G network). During reception, the 5G Sub6 RF signal may be acquired from a second cellular network 294 (e.g., a 5G network) through an antenna (e.g., the second antenna module 244), and may be preprocessed through an RFFE (e.g., the second RFFE 234). The second RFIC 224 may convert the preprocessed 5G Sub6 RF signal into a baseband signal such that the signal can be processed by a corresponding communication processor among the first communication processor 212 and the second communication processor 214.

The third RFIC 226 may convert the baseband signal generated by the second communication processor 214 into an RF signal (hereinafter referred to as 5G Above6 RF signal) of a 5G Above6 band (e.g., about 6 GHz to about 60 GHz) to be used in the second cellular network 294 (e.g., a 5G network). During reception, the 5G Above6 RF signal may be acquired from the second cellular network 294 (e.g., a 5G network) via an antenna (e.g., the antenna 248) and may be preprocessed via a third RFFE 236. The third RFIC 226 may convert the preprocessed 5G Above6 RF signal into a baseband signal such that the signal can be processed by the second communication processor 214. According to an embodiment, the third RFFE 236 may be formed as part of the third RFIC 226.

According to an embodiment, the electronic device 101 may include a fourth RFIC 228 separately from or at least as part of the third RFIC 226. In this case, the fourth RFIC 228 may convert the baseband signal generated by the second communication processor 214 into an RF signal (hereinafter referred to as an IF signal) of an intermediate frequency band (e.g., about 9 GHz to about 11 GHz) and then transmit the IF signal to the third RFIC 226. The third RFIC 226 may convert the IF signal into a 5G Above6 RF signal. During reception, the 5G Above6 RF signal may be received from a second cellular network 294 (e.g., a 5G network) via an antenna (e.g., the antenna 248) and be converted into an IF signal by the third RFIC 226. The fourth RFIC 228 may convert the IF signal into a baseband signal such that the signal can be processed by the second communication processor 214.

According to an embodiment, the first RFIC 222 and the second RFIC 224 may be implemented as at least part of a single chip or a single package. According to various embodiments, when the first RFIC 222 and the second RFIC 224 in FIG. 2A or 2B are implemented as a single chip or a single package, the first RFIC 222 and the second RFIC 224 may be implemented as an integrated RFIC. In this case, the integrated RFIC may be connected to the first RFFE 232 and the second RFFE 234 to convert a baseband signal into a signal of a band supported by the first RFFE 232 and/or the second RFFE 234, and the converted signal may be transmitted to one of the first RFFE 232 and the second RFFE 234. According to an embodiment, the first RFFE 232 and the second RFFE 234 may be implemented as at least part of a single chip or a single package. According to an embodiment, at least one antenna module of the first antenna module 242 or the second antenna module 244 may be omitted or combined with another antenna module to process RF signals of a plurality of corresponding bands.

According to an embodiment, the third RFIC 226 and the antenna 248 may be disposed on the same substrate to form the third antenna module 246. For example, the wireless communication module 192 or processor 120 may be disposed on a first substrate (e.g., a main PCB). In this case, the third RFIC 226 may be placed on a partial region (e.g., the lower surface) in a second substrate (e.g., a sub PCB) separate from the first substrate, and the antenna 248 may be placed on another partial region (e.g., the upper surface) in the second substrate, to form the third antenna module 246. The third RFIC 226 and the antenna 248 may be disposed on the same substrate, thereby reducing the length of a transmission line therebetween. That is, for example, loss (e.g., attenuation) of a signal of a high frequency band (e.g., about 6 GHz to about 60 GHz) used in 5G network communication due to a transmission line may be reduced. As a result, the electronic device 101 may improve the quality or speed of communication with the second network 294 (e.g., a 5G network).

According to an embodiment, the antenna 248 may be formed as an antenna array including a plurality of antenna elements that may be used for beamforming. In this case, the third RFIC 226 may include, for example, a plurality of phase shifters 238 corresponding to the plurality of antenna elements, as part of the third RFFE 236. During transmission, each of the plurality of phase shifters 238 may convert the phase of a 5G Above6 RF signal to be transmitted to the outside (e.g., a base station of a 5G network) of the electronic device 101 through a corresponding antenna element. During reception, each of the plurality of phase shifters 238 may convert the phase of the 5G Above6 RF signal received from the outside through the corresponding antenna element into the same or substantially the same phase. This enables transmission or reception through beamforming between the electronic device 101 and the outside.

The second cellular network 294 (e.g., a 5G network) may be operated independently (e.g., Stand-Alone (SA)) or being connected (e.g., non-standalone (NSA)) to the first cellular network 292 (e.g., a legacy network). For example, the 5G network may include only an access network (e.g., a 5G radio access network (RAN) or a next generation RAN (NG RAN)) and no core network (e.g., a next generation core (NGC)). In this case, after accessing the access network of the 5G network, the electronic device 101 may access an external network (e.g., the Internet) under the control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 230 to be accessed by other components (e.g., the processor 120, the first communications processor 212, or the second communications processor 214).

Figure 3A:
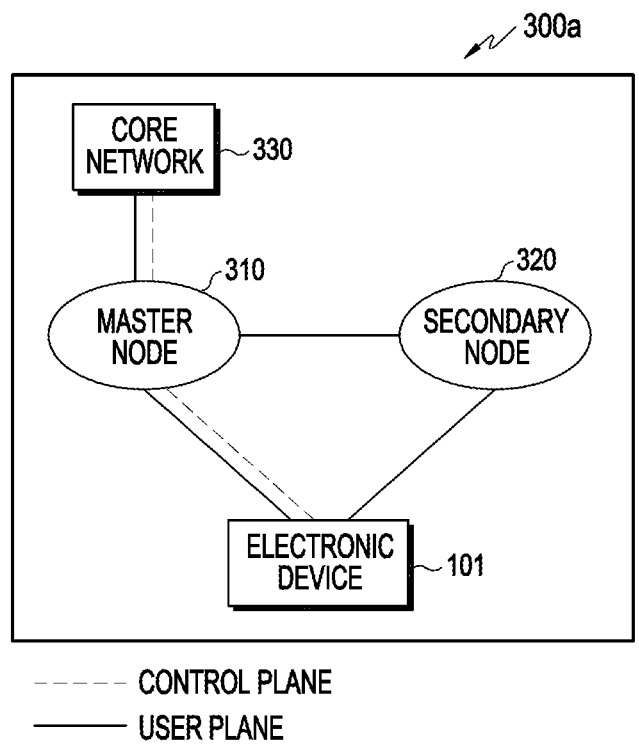
FIG. 3A is a diagram illustrating wireless communication systems configured to provide a network of legacy communication and/or 5G communication according to various embodiments.
Figure 3B:
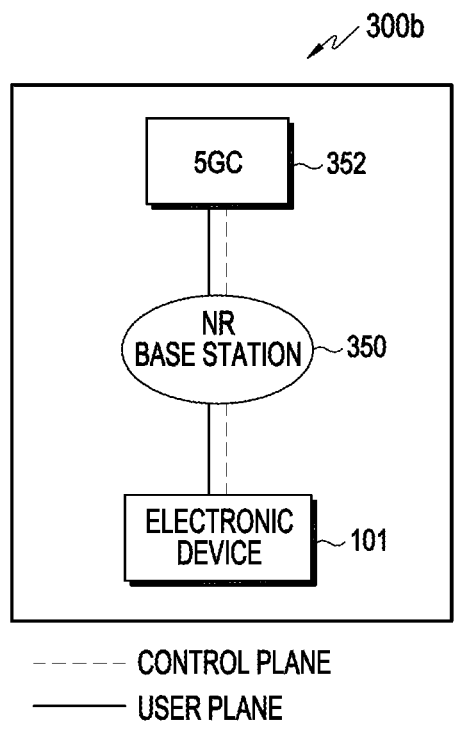
FIG. 3B is a diagram illustrating wireless communication systems configured to provide a network of legacy communication and/or 5G communication according to various embodiments.
Figure 3C:
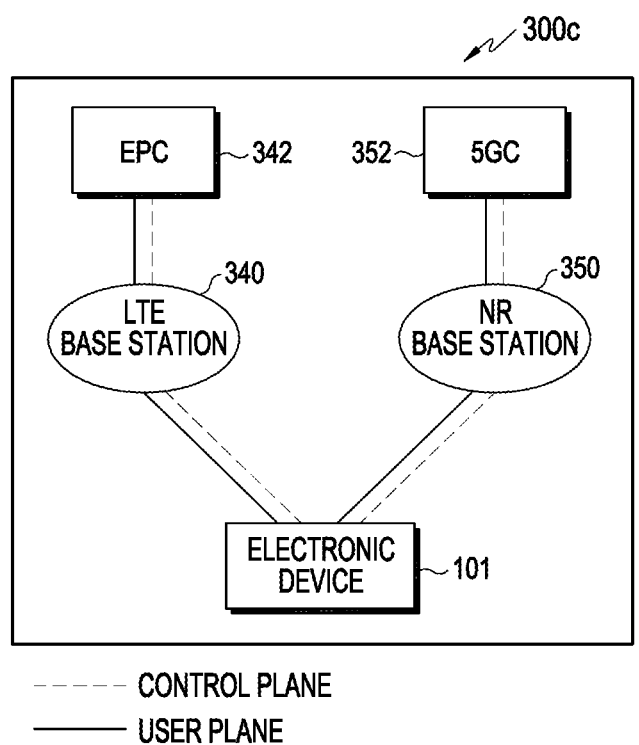
FIG. 3C is a diagram illustrating wireless communication systems configured to provide a network of legacy communication and/or 5G communication according to various embodiments.

FIGS. 3A, 3B, and 3C are diagrams illustrating wireless communication systems configured to provide a network of legacy communication and/or 5G communication according to various embodiments. Referring to FIGS. 3A, 3B, and 3C, network environments 300a to 300c may include at least one of the legacy network and the 5G network. The legacy network may include, for example, a 4G or LTE base station 340 (e.g., an eNodeB (eNB)) of the 3GPP standard supporting wireless access with the electronic device 101, and an evolved packet core (EPC) 342 managing 4G communication. The 5G network may include, for example, a New Radio (NR) base station 350 (e.g., gNodeB (gNB)) supporting wireless access with the electronic device 101, and a 5th generation core (5GC) 352 managing 5G communication of the electronic device 101.

According to various embodiments, the electronic device 101 may transmit and receive a control message and user data through legacy communication and/or 5G communication. The control message may include a message related to at least one of, for example, security control, bearer setup, authentication, registration, or mobility management of the electronic device 101. User data may refer to, for example, user data excluding control messages transmitted and received between the electronic device 101 and the core network 330 (e.g., the EPC 342).

Referring to FIG. 3A, the electronic device 101 according to an embodiment may use at least part of the legacy network (e.g., the LTE base station 340 and the EPC 342) to transmit and receive at least one of the control message or the user data to and from at least part of the 5G network (e.g., the NR base station 350, the 5GC 352).

According to various embodiments, the network environment 300a may provide wireless communication dual connectivity (DC) to the LTE base station 340 and the NR base station 350, and may include a network environment for transmitting and receiving control messages to and from the electronic device 101 through the core network 230 of either the EPC 342 or the 5GC 352.

According to various embodiments, in a DC environment, one of the LTE base station 340 or the NR base station 350 may operate as a master node (MN) 310 and the other may operate as a secondary node (SN) 320. The MN 310 may be connected to the core network 230 to transmit and receive control messages. The MN 310 and the SN 320 may be connected to each other through a network interface and may transmit/receive messages related to radio resource (e.g., a communication channel) management with each other.

According to various embodiments, the MN 310 may include an LTE base station 340, the SN 320 may include an NR base station 350, and a core network 330 may include an EPC 342. For example, a control message may be transmitted and received through the LTE base station 340 and the EPC 342, and user data may be transmitted and received through at least one of the LTE base station 340 or the NR base station 350.

According to various embodiments, the MN 310 may include the NR base station 350, the SN 320 may include the LTE base station 340, and the core network 330 may include the 5GC 352. For example, control messages may be transmitted and received through the NR base station 350 and 5GC 352, and user data may be transmitted and received through at least one of the LTE base station 340 and the NR base station 350.

Referring to FIG. 3B, according to various embodiments, the 5G network may include a NR base station 350 and a 5GC 352, and may transmit and receive control messages and user data independently of the electronic device 101.

Referring to FIG. 3C, the legacy network and the 5G network according to various embodiments may independently provide data transmission and reception. For example, the electronic device 101 and the EPC 342 may transmit and receive control messages and user data through the LTE base station 340. For another example, the electronic device 101 and the 5GC 352 may transmit and receive control messages and user data through the NR base station 350.

According to various embodiments, the electronic device 101 may be registered on at least one of the EPC 342 and the 5GC 352 to transmit and receive control messages.

According to various embodiments, the EPC 342 or the 5GC 352 may interwork with each other to manage communication of the electronic device 101. For example, movement information of the electronic device 101 may be transmitted and received through an interface between the EPC 342 and the 5GC 352.

As described above, dual connectivity through the LTE base station 340 and the NR base station 350 may be referred to as E-UTRA new radio dual connectivity (EN-DC).

Hereinafter, the structure and operation of the electronic device 101 according to various embodiments will be described in greater detail with reference to FIGS. 4A, 4B, 4C, 4D, 4E, 5A, 5B, 5C, 5D, 6, and 7. Although one communication processor 260, 610 and one RFIC 410, 620 are illustrated in each drawing of the various example embodiments to be described below as being connected to a plurality of RFFEs 431, 432, 433, 631, 632, 711 to 740, the various example embodiments are not limited thereto. For example, according to various example embodiments, the plurality of communication processors 212, 214 and/or the plurality of RFICs 222, 224, 226, 228 may be connected to the plurality of RFFEs 431, 432, 433, 631, 632, 711 to 740 as shown in FIG. 2A or FIG. 2B.

FIGS. 4A, 4B, 4C, 4D, and 4E are block diagrams illustrating example configurations of electronic devices according to various embodiments.

Figure 4A:
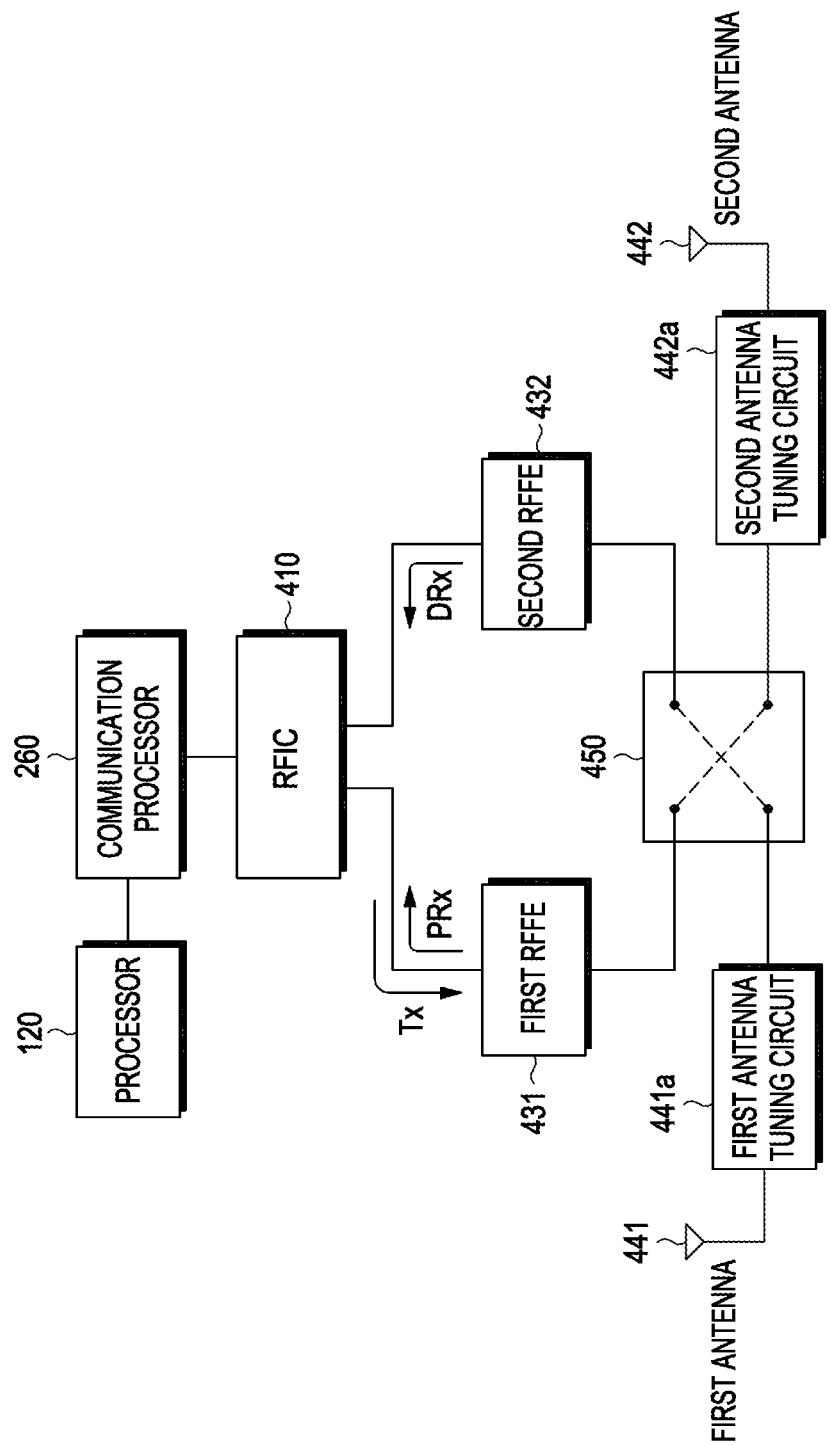
FIG. 4A is a block diagram illustrating an example configuration of an electronic device according to various embodiments.
Figure 4B:
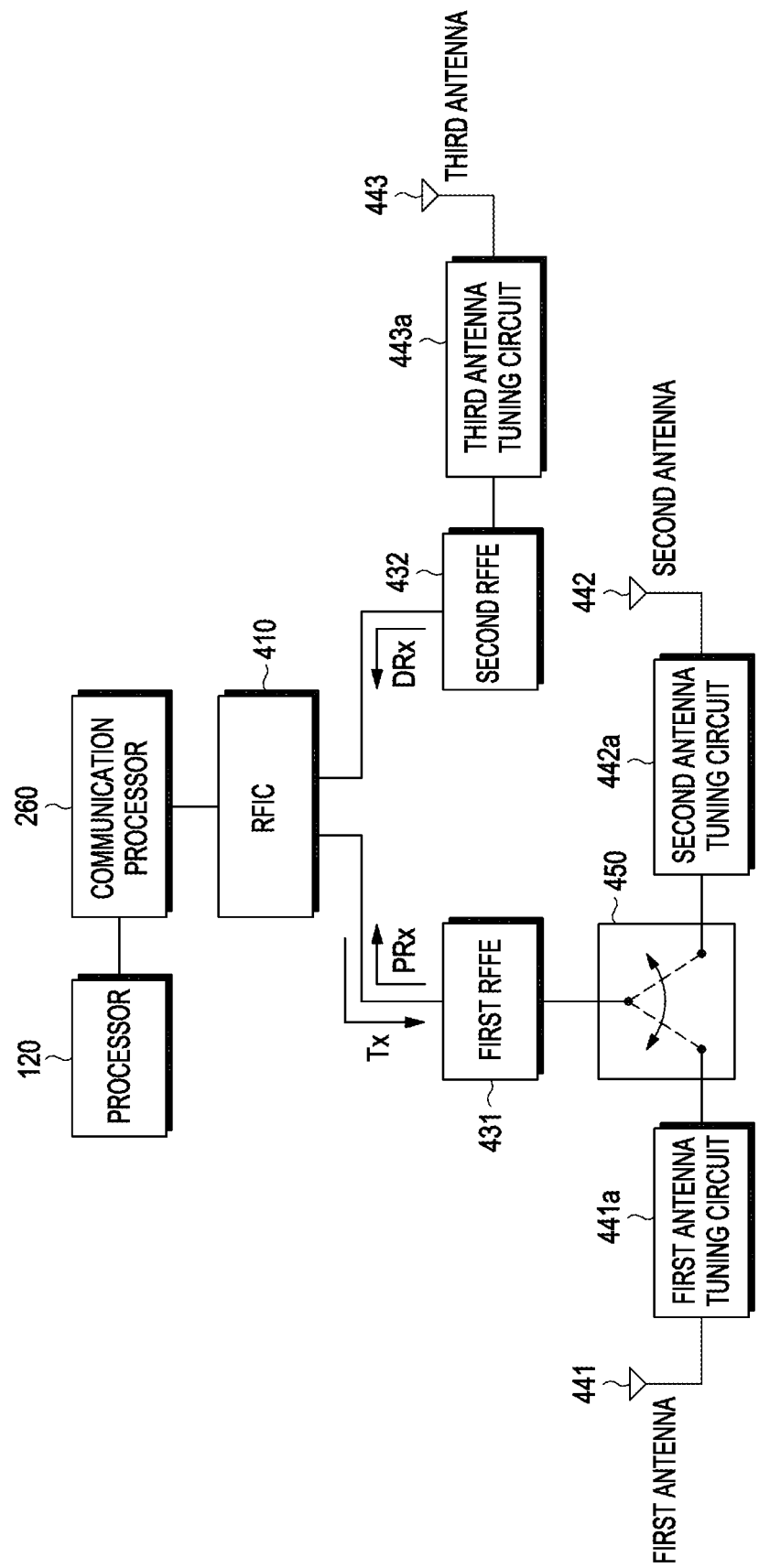
FIG. 4B is a block diagram illustrating an example configuration of an electronic device according to various embodiments.

According to various embodiments, FIG. 4A is an example of a case in which the electronic device 101 includes two antennas 441, 442 and switches a transmission path, and FIG. 4B is an example in which the electronic device 101 includes three antennas 441, 442, 443 and switches a transmission path.

Referring to FIG. 4A, an electronic device (e.g., the electronic device 101 in FIG. 1) according to various embodiments may include a processor (e.g., including processing circuitry) 120, a communication processor (e.g., including processing circuitry) 260, an RFIC 410, a first RFFE 431, a second RFEE 432, a first antenna 441, a second antenna 442, a switch 450, a first antenna tuning circuit 441a, or a second antenna tuning circuit 442a. For example, the first RFFE 431 may be disposed at the upper end in the housing of the electronic device 101, and the second RFFE 432 may be disposed at the lower end in the housing of the electronic device 101. However, various embodiments are not limited to the arrangement position described above.

According to various embodiments, during transmission, the RFIC 410 may convert a baseband signal generated by the communications processor 260 into a radio frequency (RF) signal to be used in a communications network. For example, the RFIC 410 may transmit an RF signal to be used in a communication network to the first antenna 441 or the second antenna 442 through the first RFFE 431 and the switch 450.

According to various embodiments, a transmission path for transmission from the RFIC 410 to the first antenna 441 through the first RFFE 431 and the switch 450 may be referred to as a "first antenna transmission path (Ant Tx 1)". A transmission path for transmission from the RFIC 410 to the second antenna 442 through the first RFFE 431 and the switch 450 may be referred to as a "second antenna transmission path (Ant Tx 2)". According to various embodiments, the transmission paths for the two antennas may have different path losses due to differences in the length of each transmission path and/or the components disposed on the corresponding transmission path. In addition, different antenna losses may occur because antennas (e.g., the first antenna 441, the second antenna 442) corresponding to respective antenna transmission paths are disposed at different locations on the electronic device 101.

According to various embodiments, a first antenna tuning circuit 441a may be connected to a front end of the first antenna 441, and a second antenna tuning circuit 442a may be connected to a front end of the second antenna 442. The communication processor 260 may adjust a configured value of the first antenna tuning circuit 441a and a configured value of the second antenna tuning circuit 441a, thereby adjusting (e.g., tuning) characteristics of the signal (e.g., the transmission signal (Tx)) and the signal (e.g., the reception signal (Rx)), transmitted and received through each connected antenna. A detailed embodiment thereof will be described in greater detail below with reference to FIGS. 5A, 5B, 5C, and 5D.

According to various embodiments, the communication processor 260 may control the switch 450 to perform configuration such that the first RFFE 431 is connected to the first antenna tuning circuit 441a and the first antenna 441. At this time, the transmission signal (Tx) generated by the communication processor 260 may be transmitted through the RFIC 410, the first RFFE 431, the switch 450, the first antenna tuning circuit 441a, and the antenna 441.

According to various embodiments, the first antenna 441 may be configured as a primary Rx (PRx) antenna, and the second antenna 442 may be configured as a diversity Rx (Drx) antenna. The electronic device 101 may receive and decode the signal transmitted from the base station, through the first antenna 441 and/or the second antenna 442. For example, the signal received through the first antenna 441 is the PRx signal and may be transmitted to the communication processor 260 through the first antenna tuning circuit 441a, the switch 450, the first RFFE 431, and the RFIC 410. In addition, the signal received through the second antenna 442 is the DRx signal and may be transmitted to the communication processor 260 through the second antenna tuning circuit 442a, the switch 450, the second RFFE 432, and the RFIC 410.

According to various embodiments, the first RFFE 431 may include at least one duplexer or at least one diplexer to process the transmission signal (Tx) and the reception signal (PRx) together. The second RFFE 432 may include at least one duplexer or at least one diplexer to process the transmission signal (Tx) and the reception signal (DRx) together.

According to various embodiments, the communication processor 260 may include various processing circuitry and control the switch 450 to perform configuration such that the first RFFE 431 is connected to the second antenna tuning circuit 442a and the second antenna 442. At this time, the transmission signal (Tx) generated by the communication processor 260 may be transmitted through the RFIC 410, the first RFFE 431, the switch 450, the second antenna tuning circuit 442a, and the second antenna 442.

According to various embodiments, when the first RFFE 431 is configured to be connected to the second antenna tuning circuit 442a and the second antenna 442 as described above, the second antenna 441 may be configured as a primary Rx antenna (PRx), and the first antenna 442 may be configured as a diversity Rx antenna (DRx). The electronic device 101 may receive and decode the signal transmitted from the base station, through the first antenna 441 and the second antenna 442. For example, the signal received through the second antenna 441 is a PRx signal and may be transmitted to the communication processor 260 through the second antenna tuning circuit 442a, the switch 450, the first RFFE 431, and the RFIC 410. In addition, the signal received through the first antenna 442 is a DRx signal and may be transmitted to the communication processor 260 through the first antenna tuning circuit 441a, the switch 450, the second RFFE 432, and the RFIC 410.

According to various embodiments, the communication processor 260 may configure or change (e.g., switch) an antenna to transmit the transmission signal (Tx) by controlling the switch 450 according to various configuration conditions. According to various embodiments, the communication processor 260 may configure a transmission path corresponding to an antenna capable of radiating the transmission signal (Tx) with maximum power. For example, as shown in FIG. 4A, when a transmission signal is transmitted in the electronic device 101 including a plurality of antenna transmission paths, an optimal antenna transmission path may be configured in consideration of maximum transmittable power and a channel environment (e.g., strength of a reception signal) corresponding to each antenna (e.g., the first antenna 441 and the second antenna 442). The communication processor 260 may determine an optimal antenna transmission path and control the switch 450 such that a transmission signal is transmitted through the determined optimal antenna transmission path.

According to various embodiments, for every configured time period (e.g., 640 ms) or when a specific event occurs (e.g., a case in which a SAR event occurs or an electric field situation rapidly changes, or signaling of a base station), the electronic device 101 (e.g., the communication processor 260) may identify whether the transmission path of a transmission signal is changed (or whether an antenna is switched).

For example, the electronic device 101 (e.g., the communication processor 260) may identify information related to the reception signal strength for each reception path (e.g., reference signal received power (RSRP), received strength signal indicator (RSSI), reference signal received quality (RSRQ), reception signal code power (RSCP), signal to noise ratio (SNR), or signal to interference plus noise ratio (SINR)). Referring to FIG. 4A, the electronic device 101 may identify information (e.g., a first RSRP) related to the strength of a reception signal (e.g., PRx) received through the first antenna 441 and information (e.g., a second RSRP) related to the strength of a reception signal (e.g., DRx) received through the second antenna 442. The communication processor 260 may determine an optimal transmission path, based on a strength difference (e.g., second RSRP (dBm)-first RSRP(dBm)) between reception signals with respect to the plurality of reception paths, and may determine whether to change the transmission path according to the determined optimal transmission path. For example, the communication processor 260 may calculate the average value (e.g., the RSRP average) of the difference between the reception signal strengths calculated in the previous measurement period and the difference between the currently measured strengths of reception signals. For example, when the difference between the currently measured strengths of the reception signals is equal to or greater than a first threshold (e.g., a "high threshold") (e.g., when RSRP changes rapidly), or the calculated average value is equal to or greater than a second threshold (e.g., a "low threshold") (e.g., when a continuous RSRP difference occurs), the transmission path of the transmission signal may be changed (e.g., the transmission antenna may be switched) by controlling the switch 450.

According to various embodiments, the electronic device 101 (e.g., the communication processor 260) may further consider the maximum transmittable power (Tx max power) for each transmission path, from the difference between the reception signal strengths when determining whether to change the transmission path. The maximum transmittable power may indicate the maximum transmittable power for each antenna transmission path (e.g., a transmission path transmitted through the first antenna 441 and a transmission path transmitted through the second antenna 442 in FIG. 4A) of the electronic device 101. An example of determining the maximum transmittable power will be described in greater detail below with reference to FIG. 8.

Figure 8:
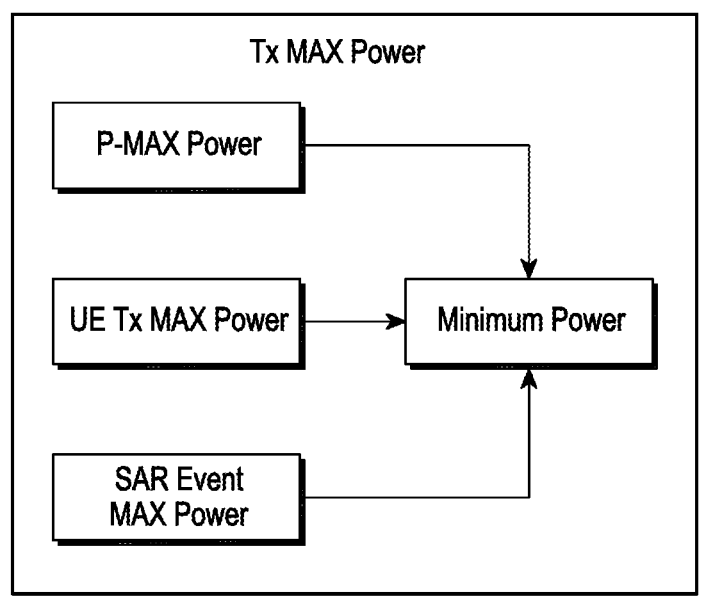
FIG. 8 is a block diagram illustrating an example method for determining maximum transmittable power according to various embodiments.

FIG. 8 is a block diagram illustrating an example method for determining the maximum transmittable power according to various embodiments. Referring to FIG. 8, according to various embodiments, the maximum transmittable power for each transmission path may be configured in consideration of at least one of SAR event maximum transmittable power (SAR EVENT MAX Power) configured in response to each SAR event, in consideration of the maximum transmittable power (P-MAX Power (PeMax)) received from each communication network (e.g., a base station), the maximum transmittable power (UE Tx MAX Power (PcMax)) for each transmission path configured in the electronic device 101, and specific absorption rate (SAR) backoff. For example, the maximum transmittable power may be determined as a minimum value among the plurality of maximum transmittable powers (e.g., P-MAX Power, UE Tx MAX Power, SAR EVENT MAX Power) mentioned above, but is not limited thereto. According to various embodiments, the maximum transmittable power of the SAR event may be configured differently according to each SAR event (e.g., a grip event or a proximity event). Hereinafter, an example of determining the maximum transmittable power for each transmission path, based on the plurality of maximum transmittable powers described above, will be described in greater detail.

According to various embodiments, the maximum transmittable power (P-MAX Power (PeMax)) received from the communication network (e.g., a base station) may be configured differently according to a power class (PC) that can be supported by each communication network or electronic device. For example, when the power class is PC2, the maximum transmittable power may be determined as a value (e.g., 25 to 27 dBm) in a range configured based on 26 dBm, and when the power class is PC3, the maximum transmittable power may be determined as a value (e.g., 22 to 24 dBm) in a range configured based on 23 dBm.

According to various embodiments, the maximum transmittable power (UE Tx MAX Power (PcMax)) for each transmission path configured in the electronic device 101 may be different because the RFFE for each transmission path is different, and may also be different because the length of each transmission path is different. Hereinafter, an example in which the maximum transmittable power (UE Tx MAX Power (PcMax)) for each transmission path configured in the electronic device 101 is different for each transmission path will be described with reference to FIG. 4E.

Figure 4C:
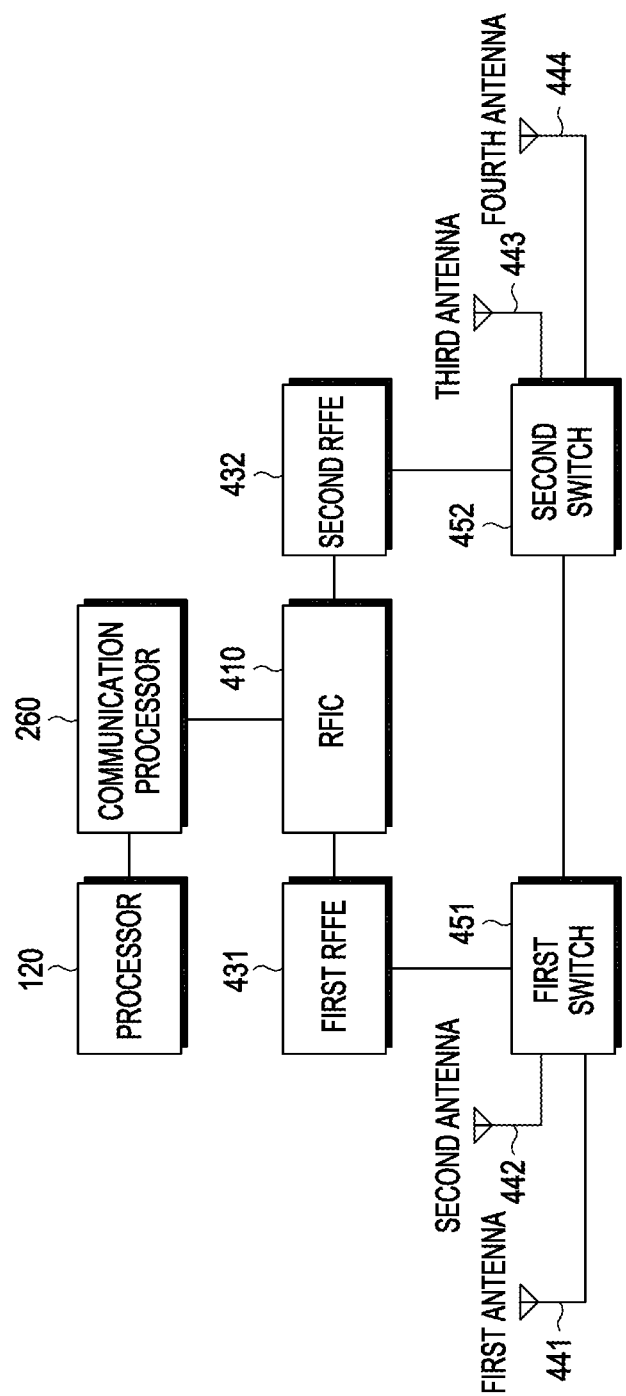
FIG. 4C is a block diagram illustrating an example configuration of an electronic device according to various embodiments.
Figure 4D:
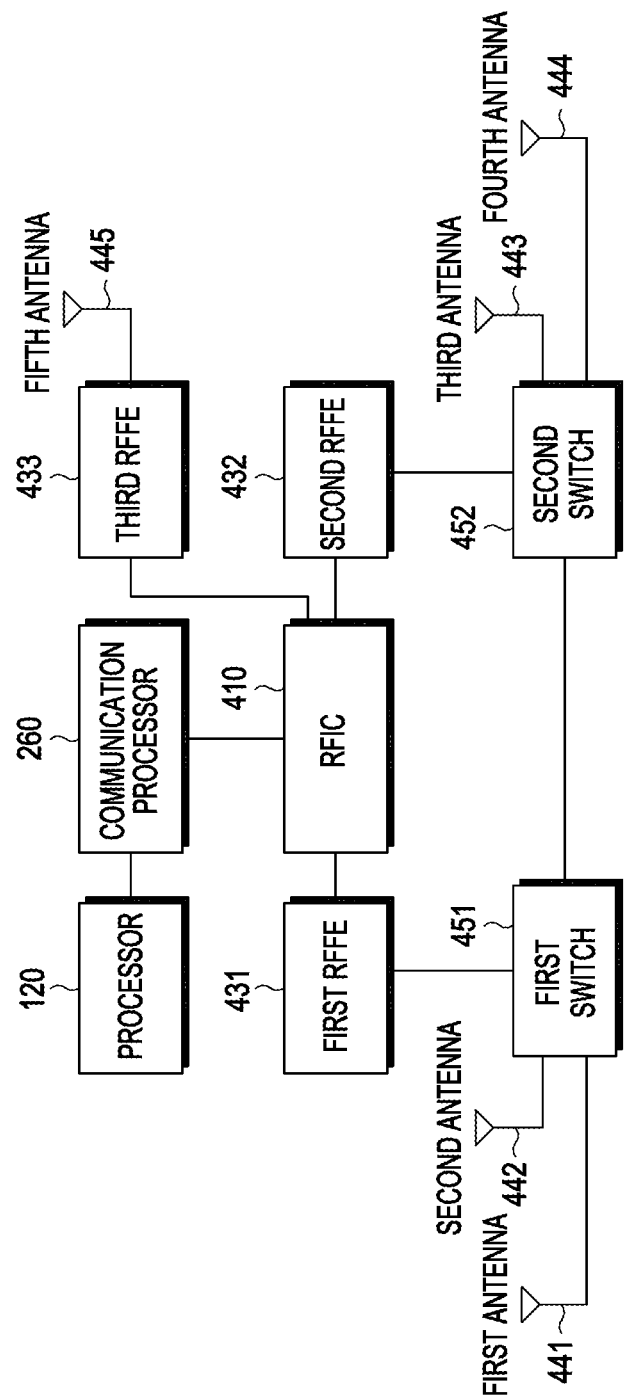
FIG. 4D is a block diagram illustrating an example configuration of an electronic device according to various embodiments.
Figure 4E:
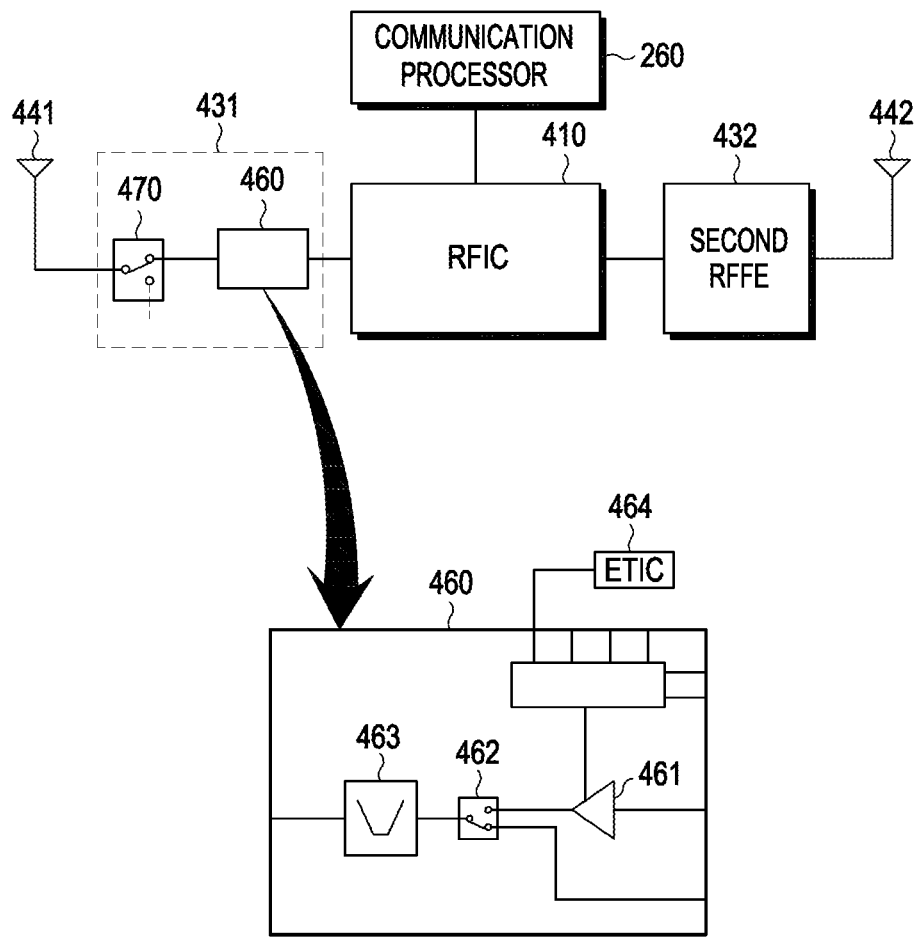
FIG. 4E is a block diagram illustrating an example configuration of an electronic device according to various embodiments.

FIG. 4E is a block diagram illustrating an example configuration of an electronic device according to various embodiments. Referring to FIG. 4E, according to various embodiments, the electronic device 101 may support communication with a plurality of communication networks. For example, the electronic device 101 may support a first communication network and a second communication network, and the first communication network and the second communication network may be the same communication network or different communication networks. For example, the first communication network may be a 5G network, and the second communication network may be a legacy network (e.g., an LTE network). When the first communication network is a 5G network, the first RFFE 431 may be designed to be suitable for processing a signal corresponding to the 5G network, and the second RFFE 432 may be designed to be suitable for processing a signal corresponding to the legacy network.

According to various embodiments, the frequency band of the signal transmitted through the first RFFE 431 and the frequency band of the signal transmitted through the second RFFE 432 may be the same, similar, or different. For example, the frequency band of the signal transmitted through the first RFFE 431 may be an N41 band (2.6 GHz), which is the frequency band of the 5G network, and the frequency band of the signal transmitted through the second RFFE 431 may be a B41 band (2.6 GHz), which is a frequency band of the LTE network. In this case, the first RFFE 431 and the second RFFE 432 may process the same or similar frequency band signals, but the first RFFE 431 may be designed to enable signal processing suitable for characteristics of the 5G network, and the second RFFE 432 may be designed to enable signal processing suitable for characteristics of an LTE network.

According to various embodiments, the first RFFE 431 may be designed to process signals of a wider frequency bandwidth than the second RFFE 432. For example, the first RFFE 431 may be designed to process up to a frequency bandwidth of 100 MHz, and the second RFFE 432 may be designed to process up to a frequency bandwidth of 60 MHz.

According to various embodiments, the first RFFE 431 may further include additional components (e.g., a single pole double throw (SPDT) switch for transmitting a sounding reference signal (SRS), a filter for preventing and/or reducing interference between WIFI signals of a similar band to a 5G signal, a component for separating a WIFI signal from a reception signal, duplexer for separating different 5G band signals) different from those of the second RFFE 432 in order to process a signal suitable for characteristics of the 5G network or to support multi-band. Referring to FIG. 4E, the first RFFE 431 may include a front end module (FEM) 460 and a first single pole double throw (SPDT) switch 470. According to various embodiments, the FEM 460 may include a power amplifier (PA) 461, a switch 462, and a filter 463. According to various embodiments, the FEM 460 may be connected to a PA envelop tracking IC (ET IC) 464 to amplify power according to the amplitude of a signal, thereby reducing current consumption and heat generation and improving the performance of the PA 461.

According to various embodiments, the first SPDT switch 470 may selectively output a sounding reference signal (SRS) (e.g., an N41 band SRS signal) and a first communication network signal (e.g., an N41 band signal) transmitted from the RFIC 410 through the FEM 460 to transmit the same through the first antenna 441. For example, attenuation (e.g., path loss) generated according to the processing of the transmission signal due to the components configured inside the first SPDT switch 470 for the SRS transmission and the first RFFE 431 and added for 5G signal processing or multi-band signal processing may be greater than that of the second RFFE 432. For example, even though the communication processor 260 controls the power amplifier of the first RFFE 431 and the power amplifier of the second RFFE 432 such that signals of the same power is transmitted, the magnitude of the signal transmitted through the first antenna module 441 may be smaller than the magnitude of the signal transmitted through the second antenna module 442 because the path loss of the first RFFE 431 is greater than the path loss of the second RFFE 432.

Referring to Table 1 below, maximum power for each transmission path may be different according to different transmission paths within the same N41 band (or B41 band).

TABLE 1

| Classification of path | Path Loss (dB) | Max Power (dBm) |
|---|---|---|
| Upper N41 | −4.59 | 24.5 dBm |
| Lower N41 | −2.1 | 27 dBm |

As noted from <Table 1>, the path loss for the upper N41 path transmitted through the first RFFE 431 is 2 dB greater or more than the path loss for the lower N41 path transmitted through the second RFFE 432.

Referring back to FIG. 4A, according to various embodiments, even though the first RFFE 431 transmits a signal of the same magnitude, the power actually radiated from the first antenna 441 via the switch 450 and the power actually radiated from the second antenna 442 via the switch 450 may be different. In addition, in relation to the maximum transmittable power that can be transmitted by the electronic device 410, the maximum transmittable power when a signal is transmitted to the first antenna 441 through the first RFFE 431, the maximum transmittable power when a signal is transmitted to the second antenna 442 through the first RFFE 431, and the maximum transmittable power when a signal is transmitted to the first antenna 441 through the second RFFE 432, and the maximum transmittable power when a signal is transmitted to the second antenna 442 through the second RFFE 432 may be different from each other.

According to various embodiments, when the first communication network transmits and receives signals in the N41 band of the 5G network, the first RFFE 431 may be designed to be suitable for processing signals corresponding to the 5G network, and the second RFFE 432 may be designed to be suitable for processing medium/high band LTE signals (e.g., B2 or B41 band signals). At least one of the first RFFE 431 and the second RFFE 432 may be configured in the form of a power amplitude module including duplexer (PAMiD).

According to various embodiments, the frequency band of the signal transmitted through the first RFFE 431 and the frequency band of the signal transmitted through the second RFFE 432 may be the same, similar, or different. For example, the frequency band of the signal transmitted through the first RFFE 431 may be an N41 band (2.6 GHz), which is a high band frequency of the 5G network, and the frequency band of the signal transmitted through the second RFFE 432 may be a B41 band (2.6 GHz), which is a high-band frequency of the LTE network. In this case, the first RFFE 431 and the second RFFE 432 may process the same or similar frequency band signals, but the first RFFE 431 may be designed to enable signal processing suitable for characteristics of the 5G network, and the second RFFE 432 may be designed to enable signal processing suitable for characteristics of the LTE network.

According to an embodiment, the frequency band of the signal transmitted through the first RFFE 434 may be the N41 band (2.6 GHz), which is a high-band frequency of the 5G network, and the frequency band of the signal transmitted through the second RFFE 432 may be the B2 band (1.9 GHz), which is a mid-band frequency of the LTE network.

According to various embodiments, the second RFFE 432 may be designed to be suitable for processing a medium/high band LTE signal (e.g., a B2 or B41 band signal), so that the first RFFE 431 and the electronic device 101 may operate as various types of EN-DC. For example, the first RFFE 431 and the second RFFE 432 may be combined to operate as an EN-DC of B2-N41 or as an EN-DC of B41-N41.

According to various embodiments, the maximum transmittable power (UE Tx MAX power) for each transmission path configured in the electronic device 101 may be configured in further consideration of the predefined maximum power reduction (MPR) or additional maximum power reduction (A-MPR) as shown in <Table 2> and <Table 3> below.

TABLE 2

| | MPR(dB) | |
|---|---|---|
| Modulation | Outer RB allocations | Inner RB allocations |
| DFT-s-OFDM PI/2 BPSK | ≤0.5 | 0 |
| DFT-s-OFDM QPSK | ≤1 | 0 |
| DFT-s-OFDM 16 QAM | ≤2 | ≤1 |
| DFT-s-OFDM 64 QAM | ≤2.5 | |
| DFT-s-OFDM 256 QAM | ≤4.5 | |
| CP-OFDM QPSK | ≤3 | ≤1.5 |
| CP-OFDM 16 QAM | ≤3 | ≤2 |
| CP-OFDM 64 QAM | ≤3.5 | |
| CP-OFDM 256 QAM | ≤6.5 | |

TABLE 3

| | MPR(dB) | | |
|---|---|---|---|
| Modulation | Edge RB allocations | Outer RB allocations | Inner RB allocations |
| DFT-s-OFDM PI/2 BPSK | ≤3.5 | ≤0.5 | 0 |
| DFT-s-OFDM QPSK | ≤3.5 | ≤1 | 0 |
| DFT-s-OFDM 16 QAM | ≤3.5 | ≤2 | ≤1 |
| DFT-s-OFDM 64 QAM | | | |
| DFT-s-OFDM 256 QAM | | | |
| CP-OFDM QPSK | ≤3.5 | ≤3 | ≤1.5 |
| CP-OFDM 16 QAM | ≤3.5 | ≤3 | ≤2 |
| CP-OFDM 64 QAM | | ≤3.5 | |
| CP-OFDM 256 QAM | | ≤6.5 | |

Referring to <Table 2> and <Table 3>, the transmittable maximum power of each antenna transmission path may be configured differently according to a difference in path loss. <Table 2> and <Table 3> show MPRs defined according to the 3GPP standard. <Table 2> shows the MPR for power class (PC) 3, and <Table 3> shows the MPR for power class 2. According to various embodiments, the MPR backoff may vary according to a modulation type or a bandwidth (BW) even in the same channel environment. According to various embodiments, when the electronic device 101 receives power class 3 in Table 2 as a power class from the base station, the maximum power of the first transmission path (e.g., the N41 transmission path at the upper end of the electronic device 101) and the second transmission path (e.g., the N41 transmission path at the lower end of the electronic device 101) may be determined differently as shown in Table 4 below.

TABLE 4

| Classification of path | Max Power (dBm) | Max Power by PC3 | CP OFDM Inner 16QAM | CP OFDM Outer 16QAM | CP OFDM 64QAM | CP OFDM 256QAM |
|---|---|---|---|---|---|---|
| Upper N41 | 24.5 dBm | 24 dBm | 22.5 dBm | 21.5 dBm | 21 dBm | 18 dBm |
| Lower N41 | 27 dBm | 24 dBm | 24 dBm | 24 dBm | 23.5 dBm | 20.5 dBm |

Referring to <Table 4>, for example, even in the same state in which the maximum transmission power (P-MAX Power) received by the electronic device 101 from the base station is 24 dBm corresponding to PC3, when the path loss described in <Table 1> and the MPR backoff described in <Table 2> and <Table 3> are applied, the maximum transmittable power for each transmission path may be configured differently according to each modulation scheme or bandwidth.

For example, in relation to the maximum transmittable power for the upper N41 transmission path (a first transmission path) in <Table 4>, when the maximum transmission power configured in the electronic device in consideration of the path loss in <Table 1> is 24.5 dBm, and the maximum transmission power corresponding to PC3 received from a base station is 24 dBm, the identified maximum transmittable power for the corresponding path may be the minimum value of 24 dBm as shown in FIG. 8. At this time, as noted from <Table 4>, when the minimum values of P-MAX Power and UE Tx MAX Power are calculated by applying the MPR backoff of <Table 2> and <Table 3> to the UE Tx MAX Power, the minimum value is 22.5 dBm in CP OFDM Inner 16QAM, 21.5 dBm in CP OFDM Outer 16QAM, 21 dBm in CP OFDM 64QAM, and 18 dBm in CP OFDM 256QAM.

In addition, for example, in relation to the maximum transmittable power for the lower N41 transmission path (a second transmission path) in <Table 4>, when the maximum transmission power configured in the electronic device in consideration of the path loss in <Table 1> is 27 dBm, and the maximum transmission power corresponding to PC3 received from a base station is 24 dBm, the identified maximum transmittable power for the corresponding path may be the minimum value of 24 dBm as shown in FIG. 8. At this time, as noted from <Table 4>, when the minimum values of P-MAX Power and UE Tx MAX Power are calculated by applying the MPR backoff of <Table 2> and <Table 3> to the UE Tx MAX Power, the minimum value is 24 dBm in CP OFDM Inner 16QAM, 24 dBm in CP OFDM Outer 16QAM, 23.5 dBm in CP OFDM 64QAM, and 20.5 dBm in CP OFDM 256QAM.

Referring to Table 4, the application of MPR varies according to a modulation scheme or bandwidth, and accordingly, the UE Tx MAX Power varies, and finally, a difference in the maximum transmittable power for each transmission path calculated according to FIG. 8 may be different. For example, the difference in the maximum transmittable power for each transmission path may be 1.5 dB in CP OFDM Inner 16QAM, 2.5 dB in CP OFDM Outer 16QAM, 1.5 dB in CP OFDM 64QAM, and 1.5 dB in CP OFDM 256QAM.

According to various embodiments, when determining the maximum transmittable power, the SAR event maximum transmittable power configured in consideration of the SAR backoff may be further considered. For example, referring to <Table 5> below, when SAR backoff is applied according to each type of SAR event, the maximum transmittable power for each path may vary. For example, when an SAR event such as a grip event or a proximity event is detected by a sensor, the electronic device 101 may apply a SAR backoff corresponding to each SAR event to the maximum transmittable power.

TABLE 5

| Classification of path | Max Power (dBm) | GRIP Event | Proximity |
|---|---|---|---|
| Upper N41 | 24 dBm | 24 dBm | 19 dBm |
| Lower N41 | 24 dBm | 21 dBm | 24 dBm |

Referring to <Table 5>, when a proximity event occurs, the SAR backoff for the proximity event is applied to the upper N41 transmission path (the first transmission path) so that the maximum transmittable power may be determined to be 19 dBm, and when a grip event occurs, the SAR backoff for the grip event is applied to the lower N41 transmission path (second transmission path) so that the maximum transmittable power may be determined to be 21 dBm. For example, the grip event may be detected by a touch sensor when the user grips the electronic device 101 with a hand, and the proximity event may be detected by a proximity sensor when the user approaches the electronic device 101 for a phone call. Event detection results by each sensor may be delivered to the communication processor 260 through the processor 120.

Hereinafter, according to various embodiments, various examples in which the electronic device 101 (e.g., the communication processor 260) determines whether to change a transmission path in consideration of the difference between the reception signal strengths and the maximum transmittable power (Tx max power) for each transmission path determined as described above will be described with reference to FIG. 4A. For convenience of description, it is assumed that the first RFFE 431 in FIG. 4A is connected to the first antenna tuning circuit 441a and the first antenna 441. Also, it is assumed that a switching threshold for changing a transmission path is 1 dB. For example, when a non-configured different transmission path has better performance than the currently configured transmission path by 1 dB or more (e.g., when the reception signal strength is greater), the currently configured transmission path may be switched.

According to various embodiments, the electronic device 101 (e.g., the communication processor 260) may identify every configured time period (e.g., 640 ms) whether a transmission path of a transmission signal is changed (or whether the antenna is switched).

Referring to FIG. 4A, the RSRP (first RSRP) of the PRx signal received through the first antenna 441, the first antenna tuning circuit 441a, the switch 450, and the first RFFE 431 may be assumed to be −90 dBm, and the RSRP (second RSRP) of the DRx signal received through the second antenna 442, the second antenna tuning circuit 442a, the switch 450, and the second RFFE 432 may be assumed to be −88 dBm, but it is not limited thereto.

When the transmission path is switched in consideration of only the strength difference between the reception signals (e.g., the second RSRP−the first RSRP), in the above example, switching for a transmission path may occur because the strength difference between the reception signals (RSRP Diff) is 2 dB (2 dBm−1 dBm) and the switching threshold is 1 dB. For example, the communication processor 260 may control the switch 450 such that a transmission signal is transmitted to the RFIC 410, the first RFFE 431, the switch 450, the second antenna tuning circuit 442a, and the second antenna 442, or transmitted to the RFIC 410, the second RFFE 432, the switch 450, the second antenna tuning circuit 442a, and the second antenna 442.

According to various embodiments, when the maximum transmission power for each transmission path is calculated in consideration of the path loss for each transmission path as described above, the maximum transmittable power of the transmission path (referred to as the first transmission path for convenience of description) through the first RFFE 431, the switch 450, the first antenna tuning circuit 441a, and the first antenna 441 may be determined to be 27 dBm, and the maximum transmittable power of the transmission path (referred to as the second transmission path for convenience of explanation) through the second RFFE 432, the switch 450, the second antenna tuning circuit 442a, and the second antenna 442 may be determined to be 24.5 dBm. In this case, whether to change the transmission path or switch the transmission antenna may be determined according to the following formula.

1. First RSRP=−90 dBm, maximum transmission power of first transmit path=27 dBm
2. Second RSRP=−88 dBm, maximum transmission power of second transmit path=24.5 dBm
3. Switching Threshold=1 dB
4. Strength difference between reception signals=2nd RSRP−1st RSRP=−88−(−90)=2 dB
5. Maximum transmission power difference=maximum transmission power of second transmit path−maximum transmission power of first transmit path=24.5−27=−2.5 dB
6. Strength difference between reception signals+maximum transmission power difference=2 dB−2.5 dB=−0.5 dB As a result of the above calculation, the value obtained by considering the strength difference between reception signals and the difference in maximum transmission power is −0.5 dB, which does not exceed the switching threshold of 1 dB, so that the current transmission path may be maintained without changing the transmission path. For example, when comparing only the difference between reception signals, the second RSRP received through a different transmission path is 2 dB greater or more than the first RSRP received through a transmission path through which the current transmission signal is transmitted, but when a transmission signal is transmitted through the path through which the second RSRP is received, power is output lower by 2.5 dB, and therefore, it may be more advantageous not to change the transmission path in this state.

According to various embodiments, in case of operation in CP OFDM and 64QAM, when the maximum transmission power for each transmission path is calculated by further considering the MPR as described above, the maximum transmittable power of the transmission path (referred to as the first transmission path for convenience of description) through the first RFFE 431, the switch 450, the first antenna tuning circuit 441a, and the first antenna 441 may be determined to be 23.5 dBm, and the maximum transmittable power of the transmission path (referred to as the second transmission path for convenience of description) through the second RFFE 432, the switch 450, the second antenna tuning circuit 442a, and the second antenna 442 may be determined to be 21 dBm. In this case, whether to change the transmission path or switch the transmission antenna may be determined according to the following formula.

1. First RSRP=−90 dBm, maximum transmission power of first transmit path=23.5 dBm
2. Second RSRP=−88 dBm, maximum transmission power of second transmit path=21 dBm
3. Switching Threshold=1 dB
4. Strength difference between reception signals=2nd RSRP−1st RSRP=−88−(−90)=2 dB
5. Maximum transmission power difference=maximum transmission power of second transmit path−maximum transmission power of first transmit path=21−23.5=−2.5 dB
6. Strength difference between reception signals+maximum transmission power difference=2 dB−2.5 dB=−0.5 dB As a result of the above calculation, the value obtained by considering the strength difference between reception signals and the difference in maximum transmission power is −0.5 dB, which does not exceed the switching threshold of 1 dB, so that the current transmission path may be maintained without changing the transmission path. For example, when comparing only the difference between reception signals, the second RSRP received through a different transmission path is 2 dB greater or more than the first RSRP received through a transmission path through which the current transmission signal is transmitted, but when a transmission signal is transmitted through the path through which the second RSRP is received, power is output lower by 2.5 dB according to the application of path loss and MPR, and therefore, it may be more advantageous not to change the transmission path in this state.

According to various embodiments, when the maximum transmission power for each transmission path is calculated by further considering the SAR backoff according to the SAR event as described above, the maximum transmittable power of the transmission path (referred to as the first transmission path for convenience of explanation) through the first RFFE 431, the switch 450, the first antenna tuning circuit 441a, and the first antenna 441 may be determined to be 21 dBm because the SAR backoff due to the grip event is applied, and the maximum transmittable power of the transmission path (referred to as the second transmission path for convenience of explanation) through the second RFFE 432, the switch 450, the second antenna tuning circuit 442a, and the second antenna 442 may be determined to be 24 dBm because no SAR backoff is applied. In this case, whether to change the transmission path or switch the transmission antenna may be determined according to the following formula. In the following example, the first RSRP and the second RSRP are −88 dBm and thus may be assumed to be the same.

1. First RSRP=−88 dBm, maximum transmission power of first transmit path=21 dBm
2. Second RSRP=−88 dBm, maximum transmission power of second transmit path=24 dBm
3. Switching Threshold=1 dB
4. Strength difference between reception signals=2nd RSRP−1st RSRP=−88−(−88)=0 dB
5. Maximum transmission power difference=maximum transmission power of second transmit path−maximum transmission power of first transmit path=24−21=3 dB
6. Strength difference between reception signals+maximum transmission power difference=0 dB+3 dB=3 dB As a result of the above calculation, the value obtained by considering the difference between strengths of the reception signals and the difference in maximum transmission power is 3 dB and exceeds the switching threshold of 1 dB, so the transmission path may be changed from the first transmission path to the second transmission path. For example, when comparing only the differences between strengths of the reception signals, since the strengths of the reception signals are the same (e.g., in the same electric field situation), the transmission path does not need to be changed. However, the power is output lower by 3 dB according to the application of a SAR backoff due to the SAR event caused by a grip in the current transmission signal. Therefore, the transmission path may be changed to another transmission path where no SAR event occurs.

As another example, a SAR event may be detected by a proximity sensor on the second transmission path. According to various embodiments, when the maximum transmission power for each transmission path is calculated by further considering the SAR backoff according to the SAR event as described above, the maximum transmittable power of the first transmission path through the first RFFE 431, the switch 450, the first antenna tuning circuit 441a, and the first antenna 441 may be determined to be 24 dBm because no SAR backoff is applied, and the maximum transmittable power of the second transmission path through the second RFFE 432, the switch 450, the second antenna tuning circuit 442a, and the second antenna 442 may be determined to be 19 dBm because a SAR backoff is applied according to the proximity event detection by the proximity sensor. In this case, whether to change the transmission path or switch the transmission antenna may be determined according to the following formula. In the example below, the first RSRP may be assumed to be −91 dBm and the second RSRP may be assumed to be −88 dBm.

1. First RSRP=−91 dBm, maximum transmission power of first transmit path=24 dBm
2. Second RSRP=−88 dBm, maximum transmission power of second transmit path=19 dBm
3. Switching Threshold=1 dB
4. Strength difference between reception signals=2nd RSRP−1st RSRP=−91−(−88)=3 dB
5. Maximum transmission power difference=maximum transmission power of second transmit path−maximum transmission power of first transmit path=19−24=−5 dB
6. Strength difference between reception signals+maximum transmission power difference=3 dB−5 dB=−2 dB As a result of the above calculation, the value obtained by considering the strength difference between reception signals and the difference in maximum transmission power is −2 dB, which does not exceed the switching threshold of 1 dB, so that the current transmission path may be maintained without changing the transmission path. For example, when comparing only the difference between reception signals, the second RSRP received through a different transmission path is 3 dB greater or more than the first RSRP received through a transmission path through which the current transmission signal is transmitted, but when a transmission signal is transmitted through the path through which the second RSRP is received, power is output lower by 5 dB due to the application of a SAR backoff by a grip event, and therefore, it may be more advantageous not to change the transmission path in this state.

In the above, examples of determining whether to change a transmission path in consideration of the strength difference between reception signals and the difference in the maximum transmission power have been described according to various embodiments. Hereinafter, examples of determining whether to change a transmission path by further considering transmission/reception imbalance, in addition to the strength difference between reception signals according to various embodiments will be described.

According to various embodiments, when determining whether to change a transmission path, the electronic device 101 (e.g., the communication processor 260) may further consider a configuration related to an imbalance state (or an imbalance value representing the degree of imbalance) between a transmission signal and a reception signal configured for each antenna of the plurality of antennas, in addition to the reception signal strength.

Referring to FIG. 4A, each of the first antenna tuning circuit 441a and the second antenna tuning circuit 442a may include at least one impedance tuning circuit or at least one aperture tuning circuit. The electronic device 101 (e.g., the communication processor 260) may adjust a configured value of the first antenna tuning circuit 441a or the second antenna tuning circuit 442a to change the frequency characteristics of signals transmitted and received through the respective antennas 441, 442. Examples of each of the antenna tuning circuits will be described in greater detail below with reference to FIGS. 5A, 5B, 5C, or 5D.

According to various embodiments, the electronic device 101 (e.g., the communication processor 260) may control configuration for each of the antenna tuning circuits (e.g., the first antenna tuning circuit 441a or the second antenna tuning circuit 442a in FIG. 4A). The transmission performance and reception performance of signals transmitted and received through the respective antennas 441 and 442 may be changed depending on the configuration. For example, according to the configuration of the antenna tuning circuit, the transmission performance may be configured to be better than the reception performance or the reception performance may be configured to be better than the transmission performance. According to various embodiments, a value (an imbalance value) indicating the degree of imbalance representing a performance difference between a transmission signal and a reception signal may be measured differently according to a configuration related to the imbalanced state (e.g., each configuration mode related to the imbalanced state) as shown in <Table 6> below.

TABLE 6

| Imbalance | Default | Tx only mode | Rx only mode | Tx/Rx balanced |
|---|---|---|---|---|
| Tx vs Rx (dB) | 1 | 5 | −2 | 2 |

Referring to <Table 6>, according to various embodiments, a value (hereinafter, referred to as "imbalance value" for convenience) indicating the degree of imbalance between a transmission signal and a reception signal may be configured to a fixed value such as "1" when an antenna tuner configuration mode is configured as default. According to various embodiments, when configuration related to the imbalance state (e.g., the antenna tuner configuration mode) is configured to a transmission-only configuration (e.g., a transmission-only mode (Tx only mode)), a reception-only configuration (e.g., a reception-only mode (Rx only mode)), and a transmission/reception balance configuration (e.g., transmission/reception balanced mode (Tx/Rx balanced mode)), the imbalance value may be different depending on the corresponding mode configurations, as shown in <Table 6> above. According to various embodiments, when the electronic device 101 (e.g., the communication processor 260) configures the antenna tuner according to the Tx only mode, the imbalance value is 5, which may indicate that the transmission performance of the corresponding antenna is 5 dB better than the reception performance. When the electronic device 101 (e.g., the communication processor 260) configures the antenna tuner according to the Rx only mode, the imbalance value is −2, which indicates that the reception performance of the corresponding antenna is 2 dB better than the transmission performance. When the electronic device 101 (e.g., the communication processor 260) configures the antenna tuner according to the Tx/Rx balanced mode, the imbalance value is 2, which indicates that the transmission performance of the corresponding antenna is 2 dB better than the reception performance.

For example, when the electronic device 101 (e.g., communication processor 260) configures the antenna tuning circuit configuration mode (antenna tuner configuration mode) to a specific mode (e.g., transmission-only mode, reception-only mode, transmission/reception balanced mode), an imbalance value indicating a difference between transmission performance and reception performance may be changed in real time according to a current channel state.

In various embodiments described below, a method in which the electronic device 101 (e.g., the communication processor 260) determines whether to change the transmission path by further considering an imbalance value which is changed in real time according to each antenna tuner configuration mode, in addition to the strength difference of the reception signal, will be described in detail.

According to various embodiments, each specific mode may operate according to a predetermined (e.g., specified) condition. For example, the transmission-only mode may be configured to further increase the transmission performance of the corresponding antenna when the power of a transmission signal transmitted through the corresponding antenna is greater than or equal to a first threshold (e.g., 10 dBm to 15 dBm) and the electric field (e.g., SNR) of a reception signal is greater than or equal to a second threshold (e.g., 5 dB). The reception performance of the corresponding antenna may be relatively lowered according to the configuration. For example, when the configuration mode is configured to the transmission-only mode, the electronic device 101 (e.g., the communication processor 260) may compare transmission performances of a plurality of tuner configured values (e.g., 141 configured values) that can be configured in the corresponding antenna tuning circuit, to perform configuration such that operation is performed with the tuner configured value providing the best transmission performance According to various embodiments, the reception-only mode may be configured to further increase the transmission performance of the corresponding antenna when the power of a transmission signal transmitted through the corresponding antenna is less than or equal to a first threshold (e.g., 10 dBm to 15 dBm) and the electric field (e.g., SNR) of a reception signal is less than or equal to a second threshold (e.g., 5 dB). The reception performance of the corresponding antenna may be relatively lowered according to the configuration. For example, when the configuration mode is configured to the reception-only mode, the electronic device 101 (e.g., the communication processor 260) may compare reception performances of a plurality of tuner configured values (e.g., 141 configured values) that can be configured in the corresponding antenna tuning circuit, to perform configuration such that operation is performed with the tuner configured value providing the best reception performance.

According to various embodiments, the transmission/reception balanced mode may be configured to improve both transmission and reception performance of the corresponding antenna when the power of a transmission signal transmitted through the corresponding antenna is equal to or greater than a first threshold (e.g., 10 dBm to 15 dBm) and the electric field (e.g., SNR) of a reception signal is less than or equal to a second threshold (e.g., 5 dB). For example, when the configuration mode is configured to the transmission/reception balanced mode, the electronic device 101 (e.g., the communication processor 260) may compare transmission performance and reception performance for a plurality of tuner configured values (e.g., 141 configured values) that can be configured in the corresponding antenna tuning circuit, and may configure the tuner configured value providing the best reception performance, to perform configuration such that operation is performed with the tuner configured value for the best reception performance among the tuner configured values within the range in which the transmission performance is configured. For example, the tuner configured value providing the best reception performance may be selected from among the tuner configured values in the range with transmission performance as low as 1 dB compared to the tuner configured value with the best transmission performance with respect to the plurality of configurable tuner configured values (e.g., 141 configured values).

The antenna tuner configuration modes may be changed according to the power of a transmission signal or the electric field of a reception signal, as in the above example. In addition, the tuner configured value may be changed in real time according to a channel environment even in each antenna tuner configuration mode. Accordingly, the transmission/reception imbalance value in each antenna tuner configuration mode may be changed.

Hereinafter, according to various embodiments, examples in which the electronic device 101 (e.g., the communication processor 260) determines whether to change the transmission path in consideration of the strength difference between reception signals and/or the transmission/reception imbalance value of an antenna determined as described above will be described with reference to FIG. 4A. For convenience of description, it is assumed that the first RFFE 431 is connected to the first antenna tuning circuit 441a and the first antenna 441 in FIG. 4A. In addition, it is assumed that a switching threshold for changing a transmission path is 1 dB. For example, when a non-configured different transmission path has better performance than the currently configured transmission path by 1 dB or more (e.g., when the reception signal strength is greater), the currently configured transmission path may be switched to the different transmission path.

According to various embodiments, the electronic device 101 (e.g., the communication processor 260) may identify whether the transmission path of the transmission signal is changed (or whether the antenna is switched) every configured time period (e.g., 640 ms).

According to various embodiments, the electronic device 101 (e.g., the communication processor 260) may be configured to the transmission-only mode in <Table 6>, and the identified imbalance value may be 5 dB. For example, the antenna tuner configuration mode may be configured to the transmission-only mode, the transmission performance may be 5 dB superior to the reception performance as the tuner configurations are adjusted according to the transmission-only mode configuration, and the identified imbalance value may be changed according to a frequency band or channel environment at each measurement even in the same antenna tuner configuration mode.

In various example embodiments described in greater detail below, the threshold for switching a transmission path is assumed to be 1 dB. Referring to FIG. 4A, the RSRP (first RSRP) of the PRx signal received through the first antenna 441, the first antenna tuning circuit 441a, the switch 450, and the first RFFE 431 may be assumed to be −91 dBm, and the RSRP (second RSRP) of the DRx signal received through the second antenna 442, the second antenna tuning circuit 442a, the switch 450, and the second RFFE 432 may be assumed to be −88 dBm, but it is not limited thereto.

When a transmission path is switched in consideration of only the strength difference between reception signals (e.g., the second RSRP−the first RSRP), transmission path switching may occur since, in the above example, the strength difference (RSRP Diff) of the reception signals is 3 dB and the switching threshold is 1. In addition, when a default value of 1 dB is applied as an imbalance value to the strength difference of the reception signals, RSRP difference (3 dB)−imbalance value (1 dB)=2 dB, which exceeds 1 dB which is the threshold for switching a transmission path, and thus, switching may occur.

According to various embodiments, when an imbalance value of 5 dB is applied to the strength difference between the reception signals in case that the identified imbalance value is 5 dB due to the current antenna tuner configuration mode configured to be the transmission-only mode, RSRP difference (3 dB)−Imbalance value (5 dB)=−2 dB, which does not exceed 1 dB which is the threshold for switching a transmission path, and thus, transmission path switching may not occur. For example, in the case of the above example, the electric field corresponding to the first antenna 441 has not been deteriorated, but the performance of a reception signal has been deteriorated due to the first antenna 441 operating in the transmission-only mode while the actual electric field is in the same state. Therefore, switching to the second antenna 442 may not occur.

In an embodiment, the RSRP (first RSRP) of the PRx signal received through the first antenna 441, the first antenna tuning circuit 441a, the switch 450, and the first RFFE 431 may be assumed to be −9 dBm, and the RSRP (second RSRP) of the DRx signal received through the second antenna 442, the second antenna tuning circuit 442a, the switch 450, and the second RFFE 432 may be assumed to be equal to −90 dBm. When the transmission path is switched in consideration of only the strength difference (e.g., second RSRP— first RSRP) between the reception signals, the strength difference (RSRP Diff) between the reception signals is 0 dB in the above example, and transmission path switching may not occur since the switching threshold is 1. In addition, when a default value of 1 dB is applied as an imbalance value to the strength difference between the reception signals, RSRP difference (0 dB)−imbalance value (1 dB)=−1 dB, which does not exceed 1 dB which is the threshold for switching a transmission path, and thus, transmission path switching may not occur.

According to various embodiments, when the imbalance value −2 dB is applied to the strength difference between reception signals in case that the imbalance value is −2 dB due to the current antenna tuner configuration mode configured to be the reception-only mode, RSRP difference (0 dB)−Imbalance value (−2 dB)=2 dB, which exceeds 1 dB which is a threshold for switching a transmission path, and thus transmission path switching may occur. For example, a phenomenon in which RSRP is good but SNR is deteriorated may occur due to nearby base stations having the same frequency. In this case, the electronic device 101 may operate in a reception-only mode to improve the performance of the reception signal. As in the above example, when the performance of a transmission signal is configured to be worse than that of a reception signal by the configuration of the reception-only mode, the loss occurring in an antenna can be reduced by switching the transmission path, which may be advantageous for improving the performance of a transmission signal and reducing current consumption.

Hereinafter, an electronic device according to various example embodiments will be described with reference to FIGS. 4B, 4C, and 4D. Since the method for determining the transmission path described above with reference to FIG. 4A may be applied identically or similarly to embodiments to be described below, duplicate descriptions may not be repeated.

FIG. 4B is a block diagram illustrating an example configuration of an electronic device according to various embodiments.

Referring to FIG. 4B, an electronic device (e.g., the electronic device 101 in FIG. 1) according to various embodiments may include a processor (e.g., including processing circuitry) 120, a communication processor (e.g., including processing circuitry) 260, an RFIC 410, a first RFFE 431, a second RFEE 432, a first antenna 441, a second antenna 442, a third antenna 443, a switch 450, a first antenna tuning circuit 441a, a second antenna tuning circuit 442a, or a third antenna tuning circuit 443a. For example, the first RFFE 431 may be disposed at the upper end in the housing of the electronic device 101, and the second RFFE 432 may be disposed at the lower end in the housing of the electronic device 101. However, various embodiments of the disclosure are not limited to the arrangement position.

According to various embodiments, during transmission, the RFIC 410 may convert a baseband signal generated by the communications processor 260 into a radio frequency (RF) signal to be used in a communications network. For example, the RFIC 410 may transmit an RF signal to be used in a communication network to the first antenna 441 or the second antenna 442 through the first RFFE 431 and the switch 450.

According to various embodiments, a transmission path for transmission from the RFIC 410 to the first antenna 441 through the first RFFE 431 and the switch 450 may be referred to as a "first antenna transmission path (Ant Tx 1)". A transmission path for transmission from the RFIC 410 to the second antenna 442 through the first RFFE 431 and the switch 450 may be referred to as a "second antenna transmission path (Ant Tx 2)". According to various embodiments, the transmission paths for the two antennas may have different path losses due to differences in the length of each transmission path and/or the components disposed on the corresponding transmission path. In addition, different antenna losses may occur because antennas (e.g., the first antenna 441, the second antenna 442) corresponding to respective antenna transmission paths are disposed at different locations on the electronic device 101. In addition, a first antenna tuning circuit 441a may be connected to a front end of the first antenna 441, and a second antenna tuning circuit 442a may be connected to a front end of the second antenna 442. The communication processor 260 may adjust configuration of the first antenna tuning circuit 441a and configuration of the second antenna tuning circuit 441a, thereby tuning the signal (e.g., the transmission signal (Tx)) and the signal (e.g., the reception signal (Rx)), transmitted and received through each connected antenna. A detailed description thereof will be described in greater detail below with reference to FIGS. 5A, 5B, 5C, and 5D.

According to various embodiments, the communication processor 260 may control the switch 450 to perform configuration such that the first RFFE 431 is connected to the first antenna tuning circuit 441a and the first antenna 441. At this time, the transmission signal (Tx) generated by the communication processor 260 may be transmitted through the RFIC 410, the first RFFE 431, the switch 450, the first antenna tuning circuit 441a, and the antenna 441.

According to various embodiments, the first antenna 441 may be configured as a primary Rx (PRx) antenna, and the third antenna 443 may be configured as a diversity Rx (Drx) antenna. The electronic device 101 may receive and decode the signal transmitted from the base station, through the first antenna 441 and the third antenna 443. For example, the signal received through the first antenna 441 is the PRx signal and may be transmitted to the communication processor 260 through the first antenna tuning circuit 441a, the switch 450, the first RFFE 431, and the RFIC 410. In addition, the signal received through the third antenna 443 is the DRx signal and may be transmitted to the communication processor 260 through the third antenna tuning circuit 443a, the second RFFE 432, and the RFIC 410.

According to various embodiments, the communication processor 260 may control the switch 450 to perform configuration such that the first RFFE 431 is connected to the second antenna tuning circuit 442a and the second antenna 442. At this time, the transmission signal (Tx) generated by the communication processor 260 may be transmitted through the RFIC 410, the first RFFE 431, the switch 450, the second antenna tuning circuit 442a, and the second antenna 442.

According to various embodiments, the second antenna 442 may be configured as a primary Rx (PRx) antenna, and the third antenna 443 may be configured as a diversity Rx (Drx) antenna. The electronic device 101 may receive and decode the signal transmitted from the base station, through the second antenna 442 and the third antenna 443. For example, the signal received through the second antenna 442 is the PRx signal and may be transmitted to the communication processor 260 through the second antenna tuning circuit 442a, the switch 450, the first RFFE 431, and the RFIC 410. In addition, the signal received through the third antenna 443 is the DRx signal and may be transmitted to the communication processor 260 through the third antenna tuning circuit 443a, the second RFFE 432, and the RFIC 410.

According to various embodiments, the communication processor 260 may configure a transmission path corresponding to an antenna capable of radiating the transmission signal (Tx) with maximum power. For example, as shown in FIG. 4B, when a transmission signal is transmitted from the electronic device 101 including a plurality of antenna transmission paths, an optimal antenna transmission path may be configured in consideration of path loss and a channel environment (e.g., reception signal strength) corresponding to each antenna (e.g., the first antenna 441, the second antenna 442, the third antenna 443). The communication processor 260 may determine an optimal antenna transmission path and control the switch 450 such that a transmission signal is transmitted through the determined optimal antenna transmission path.

According to various embodiments, the electronic device 101 (e.g., the communication processor 260) may determine whether to change a transmission path in consideration of the difference between the reception signal strengths and the maximum transmittable power (Tx max power) for each transmission path described above with reference to FIG. 4A, and since various examples may be the same as or similar to the examples in FIG. 4A, a detailed description thereof may not be repeated.

According to various embodiments, when determining whether to change a transmission path, the electronic device 101 (e.g., the communication processor 260) may determine whether to change a transmission path in further consideration of a transmission/reception imbalance value determined according to a configured value configured for the antenna tuning circuit, as described above with reference to FIG. 4A, in addition of the reception signal strength, and since various examples may be the same as or similar to the examples in FIG. 4A, a detailed description thereof may not be repeated.

A method for configuring a transmission path, described with reference to FIGS. 4A and 4B, may be equally or similarly applied to the electronic device 101 including 4 antennas or 5 antennas as shown in FIGS. 4C and 4D described in greater detail below.

In the following description, a description overlapping with the method described in FIGS. 4A and 4B may not be repeated.

FIGS. 4C and 4D are block diagrams illustrating example configurations of electronic devices according to various embodiments. According to various embodiments, FIG. 4C is an embodiment in which the electronic device 101 has two transmission paths, based on RFFE, and operates as stand-alone (SA) or non-standalone (NSA). FIG. 4D shows an embodiment in which the electronic device 101 has three transmission paths, based on RFFE, and operates as an NSA.

Referring to FIG. 4C, an electronic device (e.g., the electronic device 101 in FIG. 1) according to various embodiments may include a processor (e.g., including processing circuitry) 120, a communication processor (e.g., including processing circuitry) 260, an RFIC 410, a first RFFE 431, a second RFEE 432, a first antenna 441, a second antenna 442, a third antenna 443, a fourth antenna 444, a first switch 451, or a second switch 452. For example, the first RFFE 431 may be disposed at the upper end in the housing of the electronic device 101, and the second RFFE 432 may be disposed at the lower end in the housing of the electronic device 101. However, various embodiments are not limited to the arrangement position described above.

According to various embodiments, during transmission, the RFIC 410 may convert a baseband signal generated by the communications processor 260 into a radio frequency (RF) signal to be used in a first communications network. For example, the RFIC 410 may transmit an RF signal to be used in the first communication network to the first antenna 441 or the second antenna 442 through the first RFFE 431 and the first switch 451. In addition, the RFIC 410 may transmit an RF signal to be used in the first communication network to the third antenna 443 or the fourth antenna 444 through the first RFFE 431, the first switch 451, and the second switch 452.

According to various embodiments, during transmission, the RFIC 410 may convert a baseband signal generated by the communications processor 260 into a radio frequency (RF) signal to be used in a second communications network. For example, the RFIC 410 may transmit an RF signal to be used in the second communication network to the third antenna 443 or the fourth antenna 444 through the second RFFE 432 and the second switch 452. In addition, the RFIC 410 may transmit an RF signal to be used in the second communication network to the first antenna 441 or the second antenna 442 through the second RFFE 432, the second switch 452, and the first switch 451.

According to various embodiments, a transmission path for transmission from the RFIC 410 to the first antenna 441 through the first RFFE 431 and the first switch 451 may be referred to as a "first antenna transmission path (Ant Tx 1)". A transmission path for transmission from the RFIC 410 to the second antenna 442 through the first RFFE 431 and the first switch 451 may be referred to as a "second antenna transmission path (Ant Tx 2)". A transmission path for transmission from the RFIC 410 to the third antenna 443 through the first RFFE 431, the first switch 451, and the second switch 452 may be referred to as a "third antenna transmission path (Ant Tx 3)". A transmission path for transmission from the RFIC 410 to the fourth antenna 444 through the first RFFE 431, the first switch 451, and the second switch 452 may be referred to as a "fourth antenna transmission path (Ant Tx 4)". According to various embodiments, the transmission paths for the four antennas may have different path losses due to differences in the length of each transmission path and the components disposed on the corresponding transmission path.

According to various embodiments, when a transmission signal is transmitted from the electronic device 101 including a plurality of antenna transmission paths, the electronic device 101 (e.g., the communication processor 260) may determine whether to change a transmission path in consideration of the difference between the reception signal strengths and the maximum transmittable power (Tx max power) for each transmission path determined as described above with reference to FIG. 4A. Since various examples may be the same as or similar to the examples in FIG. 4A, detailed descriptions thereof may not be repeated.

According to various embodiments, when determining whether to change the transmission path, the electronic device 101 (e.g., the communication processor 260) may determine whether to change the transmission path in further consideration of the transmission/reception imbalance value determined according to the configured value configured for the antenna tuning circuit as described above with reference to FIG. 4A, in addition to the reception signal strength. Since various examples may be the same as or similar to the examples in FIG. 4A, a detailed description thereof may not be repeated.

FIG. 4D is a block diagram illustrating an example configuration of an electronic device according to various embodiments.

Referring to FIG. 4D, an electronic device (e.g., the electronic device 101 in FIG. 1) according to various embodiments may include a processor 120, a communication processor 260, an RFIC 410, a first RFFE 431, a second RFEE 432, a third RFEE 433, a first antenna 441, a second antenna 442, a third antenna 443, a fourth antenna 444, and a fifth antenna 445.

According to various embodiments, during transmission, the RFIC 410 may convert a baseband signal generated by the communication processor 260 into a radio frequency (RF) signal to be used in a first communication network or a second communication network. For example, the RFIC 410 may transmit an RF signal to be used in the first communication network to the first antenna 441 or the second antenna 442 through the first RFFE 431 and the first switch 451. In addition, the RFIC 410 may transmit an RF signal to be used in the first communication network to the third antenna 443 or the fourth antenna 444 through the first RFFE 431, the first switch 451, and the second switch 452.

According to various embodiments, during transmission, the RFIC 410 may convert a baseband signal generated by the communications processor 260 into a radio frequency (RF) signal to be used in the second communications network. For example, the RFIC 410 may transmit an RF signal to be used in the second communication network to the third antenna 443 or the fourth antenna 444 through the second RFFE 432 and the second switch 452. In addition, the RFIC 410 may transmit an RF signal to be used in the second communication network to the first antenna 441 or the second antenna 442 through the second RFFE 432, the second switch 452, and the first switch 451.

According to various embodiments, during transmission, the RFIC 410 may convert a baseband signal generated by the communications processor 260 into a radio frequency (RF) signal to be used in a third communications network. For example, the RFIC 410 may transmit an RF signal to be used in the third communication network to the fifth antenna 445 through the third RFEE 433.

According to various embodiments, during reception, an RF signal may be obtained from the first communication network through the first antenna 441 or the second antenna 442 and be preprocessed through the first RFFE 431 via the first switch 451. The RFIC 410 may convert the RF signal preprocessed through the first RFFE 431 into a baseband signal such that the signal can be processed by the communication processor 260. In addition, the RF signal may be obtained from the second communication network through the third antenna 443 or the fourth antenna 444 and be preprocessed through the second RFFE 432 via the second switching 452. The RFIC 410 may convert the RF signal preprocessed through the second RFFE 432 into a baseband signal such that the signal can be processed by the communication processor 260. In addition, an RF signal may be obtained from the third communication network through the fifth antenna 445 and be preprocessed through the third RFFE 433. The RFIC 410 may convert the RF signal preprocessed through the third RFFE 433 into a baseband signal such that the signal can be processed by the communication processor 260.

According to various embodiments, the first communication network, the second communication network, and the third communication network may be the same or different communication networks. For example, the first communication network may be a 5G network, and the second communication network and the third communication network may be legacy networks (e.g., LTE networks). According to various embodiments, the second communication network and the third communication network may support communication of different frequency bands even though the second communication network and the third communication network are the same LTE network. For example, the second communication network may be a communication network that transmits and receives a signal of a high band LTE (e.g., B41 band) signal, and the fourth communication network may be a communication network that transmits and receives signals of a low band LTE (e.g., B5 band, B12 band, or B71 band). According to various embodiments, the low band frequency may be 0.6 GHz to 1.0 GHz, the mid band frequency may be 1.7 GHz to 2.2 GHz, and the high band frequency may be 2.3 GHz to 3.7 GHz. However, this is classified as an example for better understanding, and various embodiments are not limited to the specific frequency range.

According to various embodiments, when the first communication network transmits and receives a signal in the N41 band of the 5G network, the first RFFE 431 may be designed to be suitable for processing a signal corresponding to the 5G network, the second RFFE 432 may be designed to be suitable for processing a high-band LTE signal (e.g., a B41 band signal), and the third RFFE 433 may be designed to be suitable for processing a low-band LTE signal (e.g., a B5 band signal). At least one of the second RFFE 432 and the third RFFE 433 may be configured in the form of a power amplitude module including duplexer (PAMiD).

According to various embodiments, the frequency band of the signal transmitted through the first RFFE 431 and the frequency band of the signal transmitted through the second RFFE 432 may be the same, similar, or different. For example, the frequency band of the signal transmitted through the first RFFE 431 may be the N41 band (2.6 GHz), which is the frequency band of the 5G network, and the frequency band of the signal transmitted through the second RFFE 431 may be the B41 band (2.6 GHz), which is a frequency band of the LTE network. In this case, the first RFFE 431 and the second RFFE 432 may process the same or similar frequency band signals, but the first RFFE 431 may be designed to enable signal processing suitable for the characteristics of the 5G network, and the second RFFE 432 may be designed to enable signal processing suitable for characteristics of an LTE network.

According to various embodiments, the first RFFE 431 may be designed to process signals of a wider frequency bandwidth than the second RFFE 432. For example, the first RFFE 431 may be designed to process up to a frequency bandwidth of 100 MHz, and the second RFFE 432 may be designed to process up to a frequency bandwidth of 60 MHz.

According to various embodiments, the first RFFE 431 may further include additional components (e.g., a single pole double throw (SPDT) switch for transmitting a sounding reference signal (SRS) signal, a filter for preventing and/or reducing interference between WIFI signals of a similar band to a 5G signal, a component for separating a WIFI signal from a received signal, a duplexer for separating different 5G band signals) different from the second RFFE 432 for signal processing suitable for characteristics of a 5G network or for multi-band support. Since the first RFFE 431 further includes additional components compared to the second RFFE 432, attenuation (e.g., path loss) generated according to processing of a transmission signal may be greater. For example, even though the RFIC 410 controls the power amplifier of the first RFFE 431 and the power amplifier of the second RFFE 432 to transmit signals of the same power, path loss of the first RFFE 431 is greater than path loss of the second RFFE 432, the magnitude of the signal transmitted through the first antenna module 441 may be smaller than the magnitude of the signal transmitted through the second antenna module 442.

According to various embodiments, when a transmission signal is transmitted from the electronic device 101 including the plurality of antenna transmission paths, the electronic device 101 (e.g., the communication processor 260) may determine whether to change the transmission path in further consideration of the difference between the reception signal strengths and the maximum transmittable power (Tx max power) for each transmission path determined as described above with reference to FIG. 4A. Since various examples may be the same as or similar to the examples in FIG. 4A, a detailed description thereof may not be repeated.

According to various embodiments, when determining whether to change the transmission path, the electronic device 101 (e.g., the communication processor 260) may determine whether to change the transmission path in further consideration of the transmission/reception imbalance value determined according to the configured value configured for the antenna tuning circuit as described above with reference to FIG. 4A, in addition to the reception signal strength. Since various examples may be the same as or similar to the examples in FIG. 4A, a detailed description thereof may not be repeated.

FIGS. 5A, 5B, 5C and 5D are diagrams illustrating various antenna tuning circuits according to various embodiments.

Figure 5A:
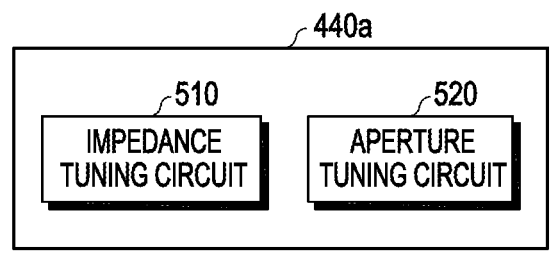
FIG. 5A is a block diagram illustrating an example antenna tuning circuit according to various embodiments.
Figure 5B:
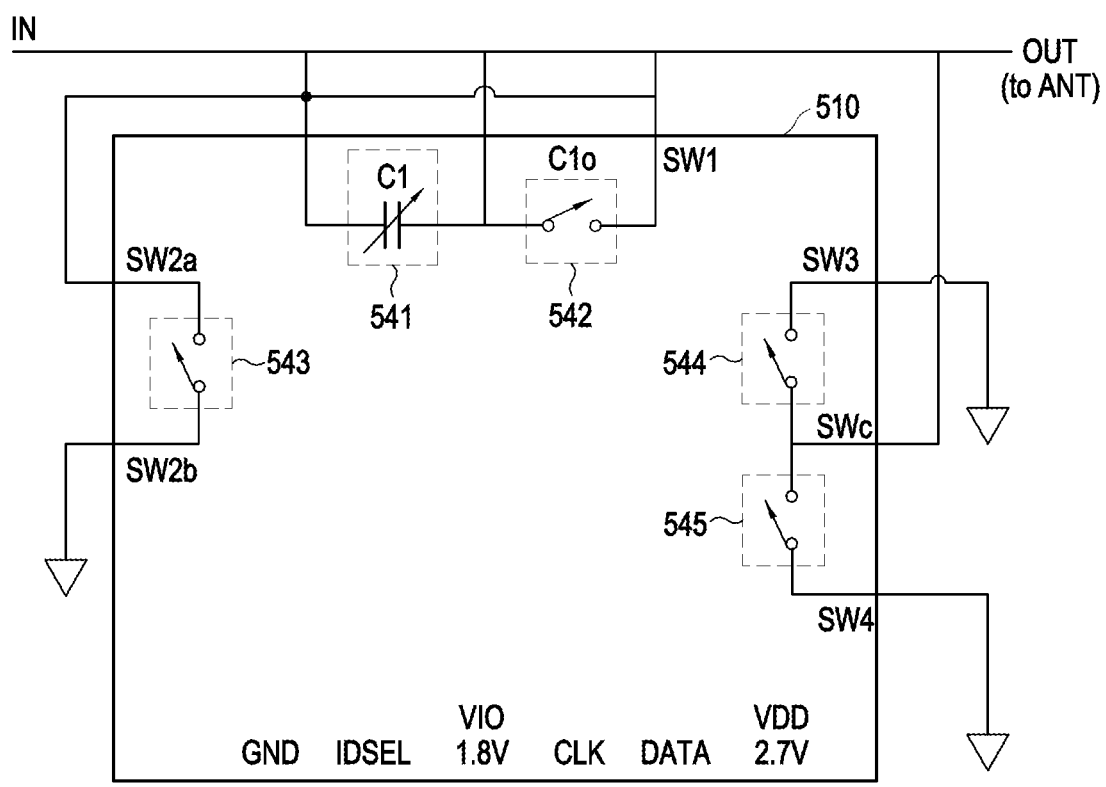
FIG. 5B is a circuit diagram illustrating an example antenna tuning circuit according to various embodiments.

Referring to FIG. 5A, the antenna tuning circuit 440*a* (e.g., the first antenna tuning circuit 441*a*, the second antenna tuning circuit 442*a*, and the third antenna tuning circuit 443*a* of FIG. 4A) according to various embodiments may include at least one impedance tuning circuit 510 and at least one aperture tuning circuit 520. The second antenna tuning circuit 442*a* may be implemented identically to the first antenna tuning circuit 441*a*, but may also be implemented differently. The impedance tuning circuit 510 according to various embodiments may be configured to perform impedance matching with a network under the control of at least one processor (e.g., the processor 120, the communications processors 212, 214, and/or the integrated communications processor 260). The aperture tuning circuit 520 according to various embodiments may change the structure of an antenna by turning on/off a switch under the control of at least one processor. An example circuit diagram for illustrating the impedance tuning circuit 510 is illustrated in FIG. 5B. An example circuit diagram for illustrating the aperture tuning circuit 520 is illustrated in FIG. 5C.

Referring to FIG. 5B, the impedance tuning circuit 510 according to various embodiments may include at least one variable capacitor 541, a first switch 542, a second switch 543, a third switch 544, and a fourth switch 545. According to various embodiments, the number of the variable capacitor 541, the first switch 542, the second switch 543, the third switch 544, and the fourth switch 545 may be changed. The at least one variable capacitor 541, the first switch 542, the second switch 543, the third switch 544, and the fourth switch 545 according to various embodiments may be implemented on a single chip. The variable capacitor 541 according to various embodiments may have, for example, 16 values (e.g., capacitance values). According to various embodiments, the number of capacitance values of the variable capacitor 541 may be changed. In this case, the impedance tuning circuit 510 according to various embodiments may have a total of 256 (16 (possible values that the variable capacitor can have)×16 (the number of possible cases with a combination of four switches)) configurable values. (e.g., an impedance value). The variable capacitor 541 according to various embodiments may be electrically connected to the first switch 542. One end of each of the second switch 543, the third switch 544, and the fourth switch 545 according to various embodiments may be grounded.

Figure 5C:
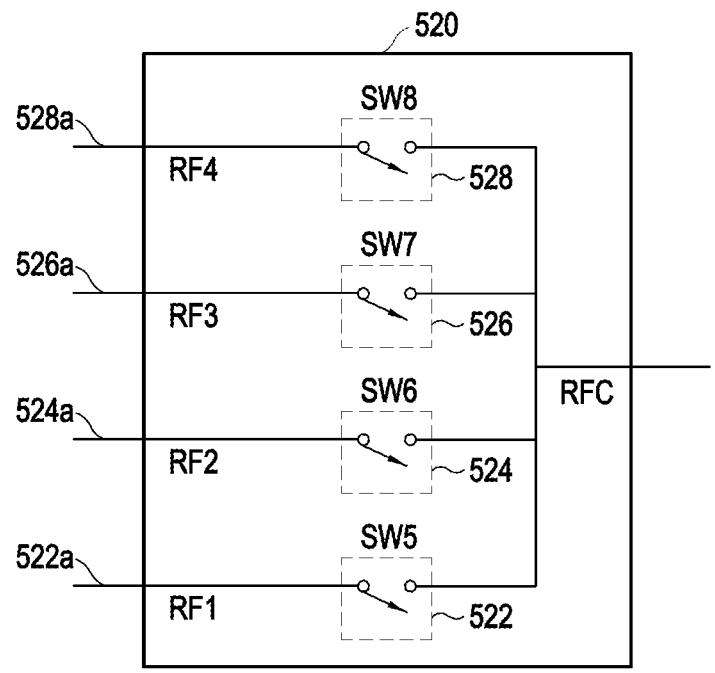
FIG. 5C is a diagram illustrating an example antenna tuning circuit according to various embodiments.

Referring to FIG. 5C, the aperture tuning circuit 520 according to various embodiments may include a fifth switch 522, a sixth switch 524, a seventh switch 526, and an eighth switch 528. According to various embodiments, the fifth switch 522 may be connected to a first terminal (RF1, 522*a*). According to various embodiments, the sixth switch 524 may be connected to a second terminal (RF2, 524*a*). According to various embodiments, the seventh switch 526 may be connected to a third terminal (RF3, 526*a*). According to various embodiments, the eighth switch 528 may be connected to a fourth terminal (RF4, 528*a*). According to various embodiments, the number of switches included in the aperture tuning circuit 520 may be changed. According to various embodiments, the fifth switch 522, the sixth switch 524, the seventh switch 526, and the eighth switch 528 may be implemented on a single chip. According to various embodiments, the aperture tuning circuit 520 may have a total of 16 cases with on/off combinations of switches (e.g., the fifth switch 522, the sixth switch 524, the seventh switch 526, and the eighth switch 528). Accordingly, the tuning circuit 250 according to various embodiments may have configurations for a total of 4096 (e.g., 256×16) antenna.

As shown in FIGS. 5B and 5C, the resonance characteristics of the connected antenna (e.g., the resonance frequency of the antenna) may be changed according to a change in the on/off state of a switch included in the antenna tuning circuit 440a (e.g., the impedance tuning circuit 510 and/or the aperture tuning circuit 520). A combination of on/off states of a switch may be referred to as an antenna configuration, and antenna resonance characteristics may be changed, or antenna efficiency may be changed according to the antenna configuration.

Figure 5D:
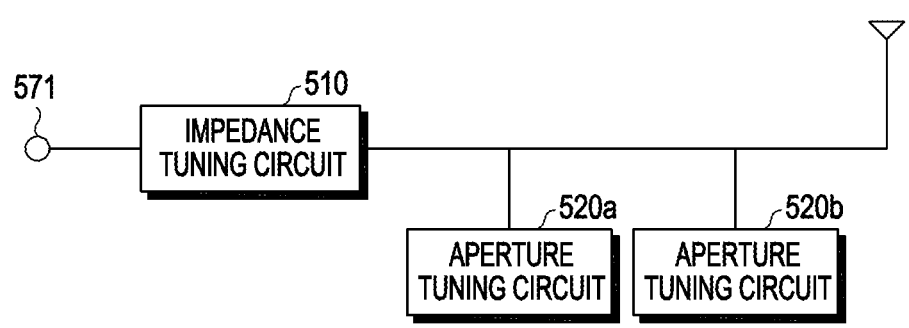
FIG. 5D is a block diagram illustrating an example antenna tuning circuit according to various embodiments.

According to various embodiments, as shown in FIG. 5D, the impedance tuning circuit 510 may be connected to a conduction point 571. The conduction point 571 may be connected to, for example, an RFFE (e.g., the first RFFE 431 and the second RFFE 432 in FIGS. 4A and 4B) and may be connected to a duplexer of the RFFE. The conduction point 571 may indicate a power rail (or power lane) to which the RFFE and the antenna tuning circuit are connected. The impedance tuning circuit 510 may be connected to the antenna 530, and the aperture tuning circuits 520a and 520b may be connected to the power rail connecting the impedance tuning circuit 510 and the antenna According to various embodiments, the electronic device 101 (e.g., the communication processor 260) may change the configuration value of the antenna tuning circuit 440a according to the antenna tuner configuration mode as described above. As described above, the electronic device 101 may perform control such that an on/off state of a switch included in the antenna tuning circuit 440a (e.g., the impedance tuning circuit 510 and/or the aperture tuning circuit 520) is changed according to the change of the configuration value of the antenna tuning circuit 440a. According to various embodiments, when determining whether to change a transmission path, the electronic device 101 may further consider a transmission/reception imbalance value determined according to a change in the configuration value of the antenna tuning circuit 440a.

Hereinafter, a method for controlling a transmission path according to various embodiments will be described with reference to FIG. 6.

Figure 6:
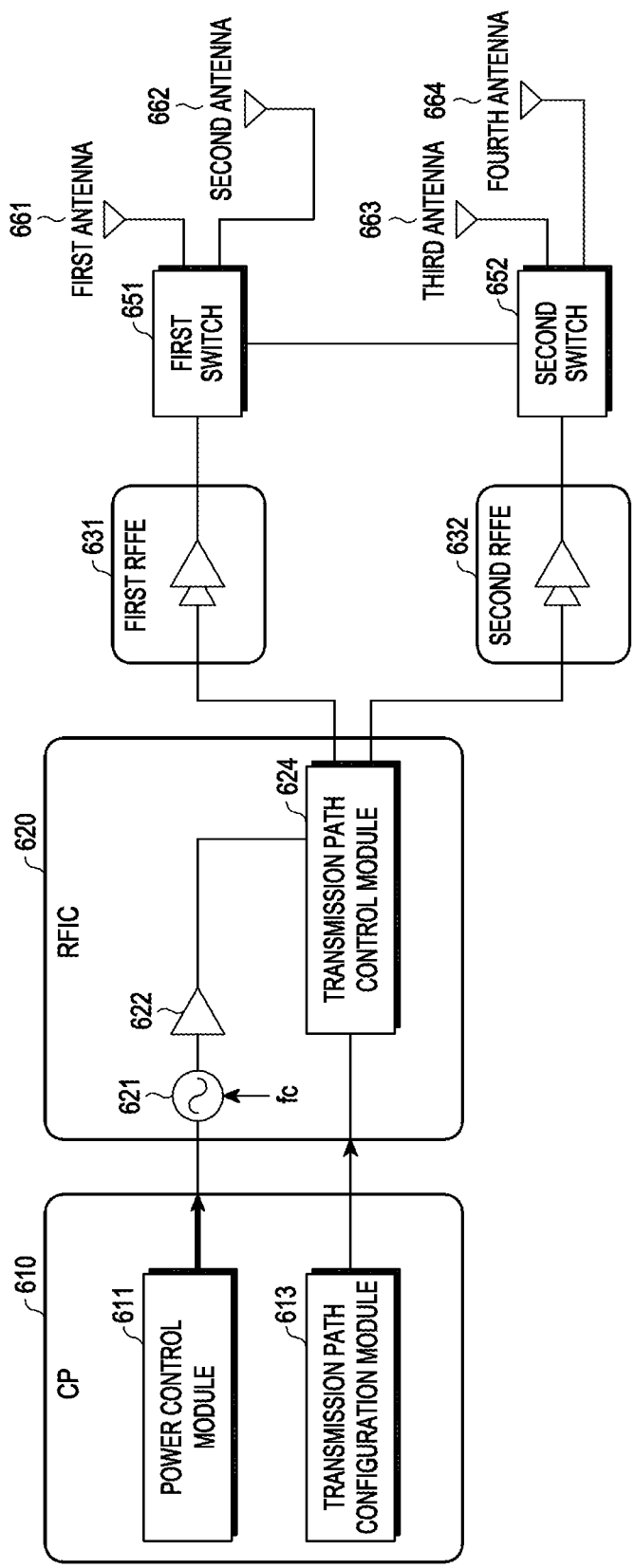
FIG. 6 is a circuit diagram illustrating a circuit of an electronic device according to various embodiments.

FIG. 6 is a circuit diagram illustrating example circuits of an electronic device according to various embodiments. Referring to FIG. 6, an electronic device (e.g., the electronic device 101 in FIG. 1) may include a communication processor (e.g., including processing circuitry) 610 (hereinafter referred to as a CP), an RFIC 620, a first RFFE 631, a second RFFE. 632, a first switch 651, a second switch 652, a first antenna 661, a second antenna 662, a third antenna 663, and a fourth antenna 664. According to various embodiments, the CP 610 may include a power control module (e.g., including various circuitry and/or executable instructions) 611 and a transmission path configuration module (e.g., including various circuitry and/or executable instructions) 613. The RFIC 620 may include a mixer 621, an amplifier 622, and a transmission path control module (e.g., including various circuitry and/or executable instructions) 624.

According to various embodiments, the CP 610 may generate a signal to be transmitted and transmit the signal to the RFIC 620, and the RFIC 620 may convert the signal received from the CP 610 into a signal of a frequency band to be transmitted through a mixer 621. The power control module 611 of the CP 610 may control the RFIC 620 to adjust the power level of the amplifier 622, based on the transmission target power of a transmission signal to be transmitted. For example, the signal frequency-converted through the mixer 621 may be amplified through the amplifier 622 to a power level configured according to the control of the power control module 611, and be then transmitted to the first RFFE 631. A power amplifier (PA) included in the first RFFE 631 may amplify the signal to be transmitted, according to the configured power level to output the amplified signal to an antenna (e.g., the first antenna 661, the second antenna 662, the third antenna 663, the fourth antenna 664) through the first switch 651 or the second switch 652. According to various embodiments, the CP 610 or the RFIC 620 may control the first switch 651 or the second switch 652 to perform control such that the signal transmitted from the first RFFE 631 is output to any one of the first antenna 661, the second antenna 662, the third antenna 663, and the fourth antenna 664.

According to various embodiments, the transmission path configuration module 613 may determine a transmission path in further consideration of the maximum transmittable power for each transmission path in addition to the strength difference between the reception signals received through respective reception paths. According to various embodiments, the transmission path control module 624 of the RFIC 620 may perform control such that a transmission signal to be transmitted is transmitted to the first RFFE 631 or the second RFFE 632 according to the configuration of the transmission path configuration module 613. According to various embodiments, the communication processor 610 may control the first switch 651 or the second switch 652 according to the determined transmission path.

According to various embodiments, when determining whether to change the transmission path, the transmission path configuration module 613 may further consider a transmission/reception imbalance value determined according to an antenna tuner configuration mode configured for at least one antenna in addition to the strength difference between the reception signals. According to various embodiments, the communication processor 610 may control configuration for at least one antenna tuning circuit (e.g., the first antenna tuning circuit 441a, the second antenna tuning circuit 442a, or the third antenna tuning circuit 443a in FIGS. 4A and 4B), based on the strength difference between reception signals and the transmission/reception imbalance value.

Figure 7:
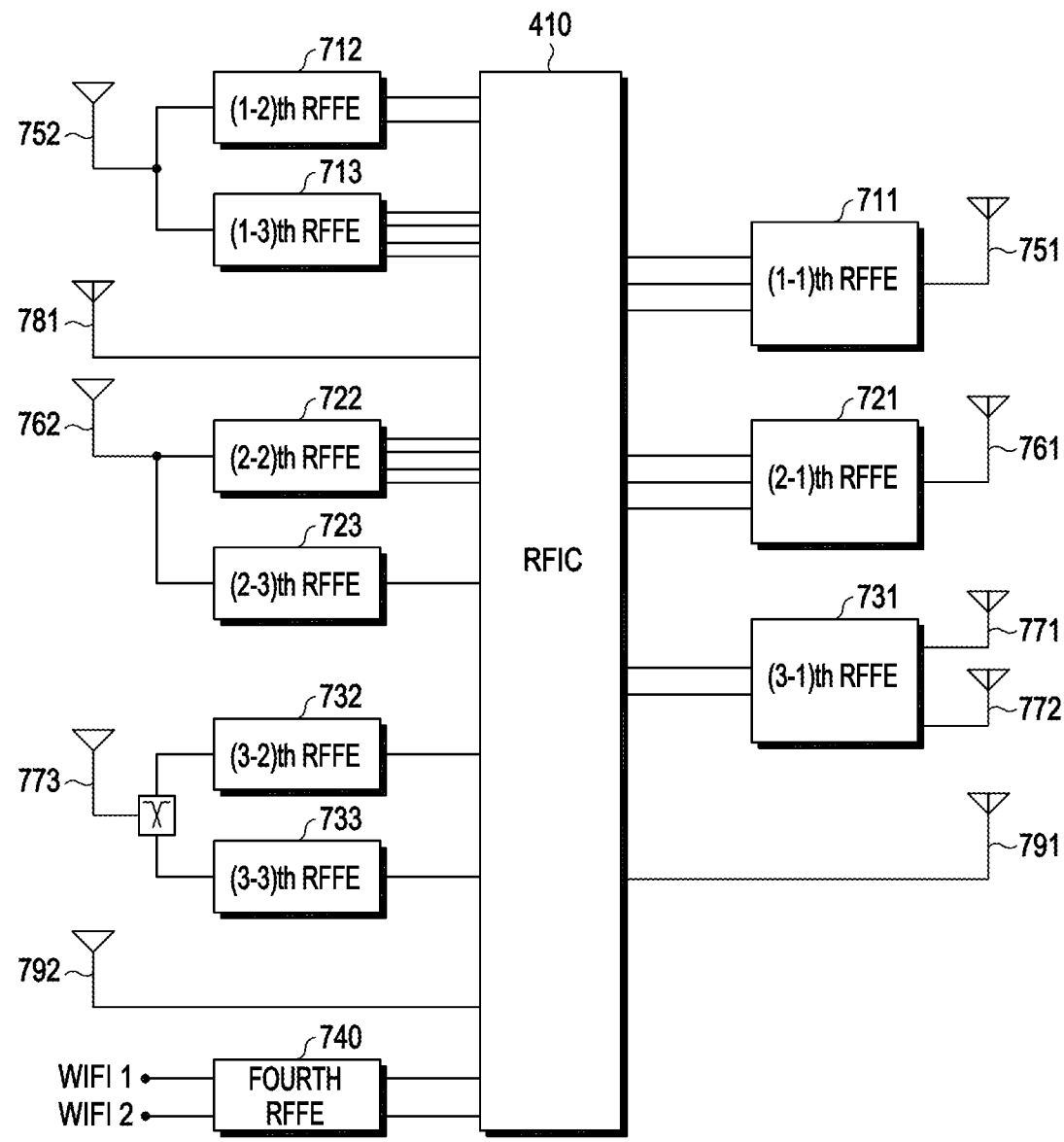
FIG. 7 is a block diagram illustrating an example configuration of an electronic device according to various embodiments.

FIG. 7 is a block diagram illustrating an example configuration of an electronic device according to various embodiments. Referring to FIG. 7, at least one RFIC 410 may be connected to a plurality of RFFEs 711, 712, 713, 721, 722, 723, 731, 732, 733, 740. The plurality of RFFEs 711, 712, 713, 721, 722, 723, 731, 732, 733, 740 may be connected to a plurality of antennas 751, 752, 761, 762, 771, 772, 773, 781, 791, 792, respectively.

According to various embodiments, a (1-1)th RFFE 711 and a (2-1)th RFFE 721 may be connected to a first main antenna 751 and a second main antenna 761, respectively. A (1-2)th RFFE 712 and a (1-3)th RFFE 713 may be connected to a first sub antenna 752 to provide diversity and the first main antenna 751. A (2-2)th RFFE 722 and a (2-3)th RFFE 723 may be connected to a second sub antenna 762 to provide diversity and the second main antenna 761. A (3-1)th RFFE 731 may be connected to two third main antennas 771, 772 to provide MIMO. In addition, a (3-2)th RFFE 732 and a (3-3)th RFFE 733 may be connected to a third sub antenna 773 through a duplexer to provide MIMO or diversity and the third main antennas 771, 772. A fifth antenna 781 may be directly connected in the RFIC 410 without passing through the RFFE. A (6-1)th antenna 791 and a (6-2)th antenna 792 may also be directly connected in the RFIC 410 without passing through the RFFE, and may provide MIMO or diversity through two antennas. A fourth RFFE 740 may be connected to two WIFI antennas.

According to various embodiments, at least one of the RFFEs of FIG. 7 may correspond to one of the first RFFE 431, the second RFFE 432, and the third RFFE 433 described above in FIGS. 4A, 4B, 4C, and 4D. At least one of the antennas of FIG. 7 may correspond to one of the first antenna 441, the second antenna 442, the third antenna 443, the fourth antenna 444, and the fifth antennas 445 described above in FIGS. 4A, 4B, 4C, and 4D.

Figure 9:
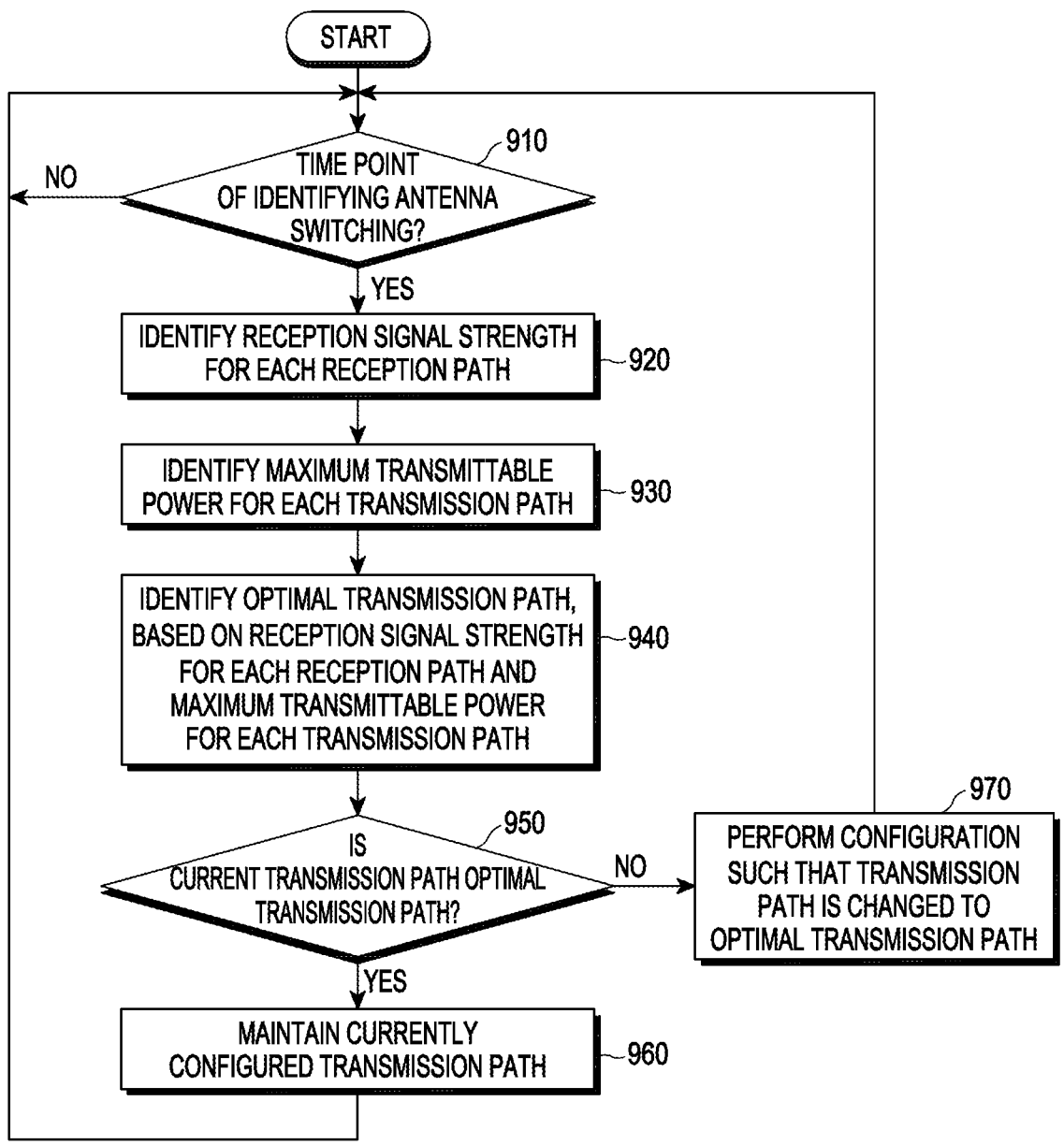
FIG. 9 is a flowchart illustrating an example method for operating an electronic device according to various embodiments.
Figure 10:
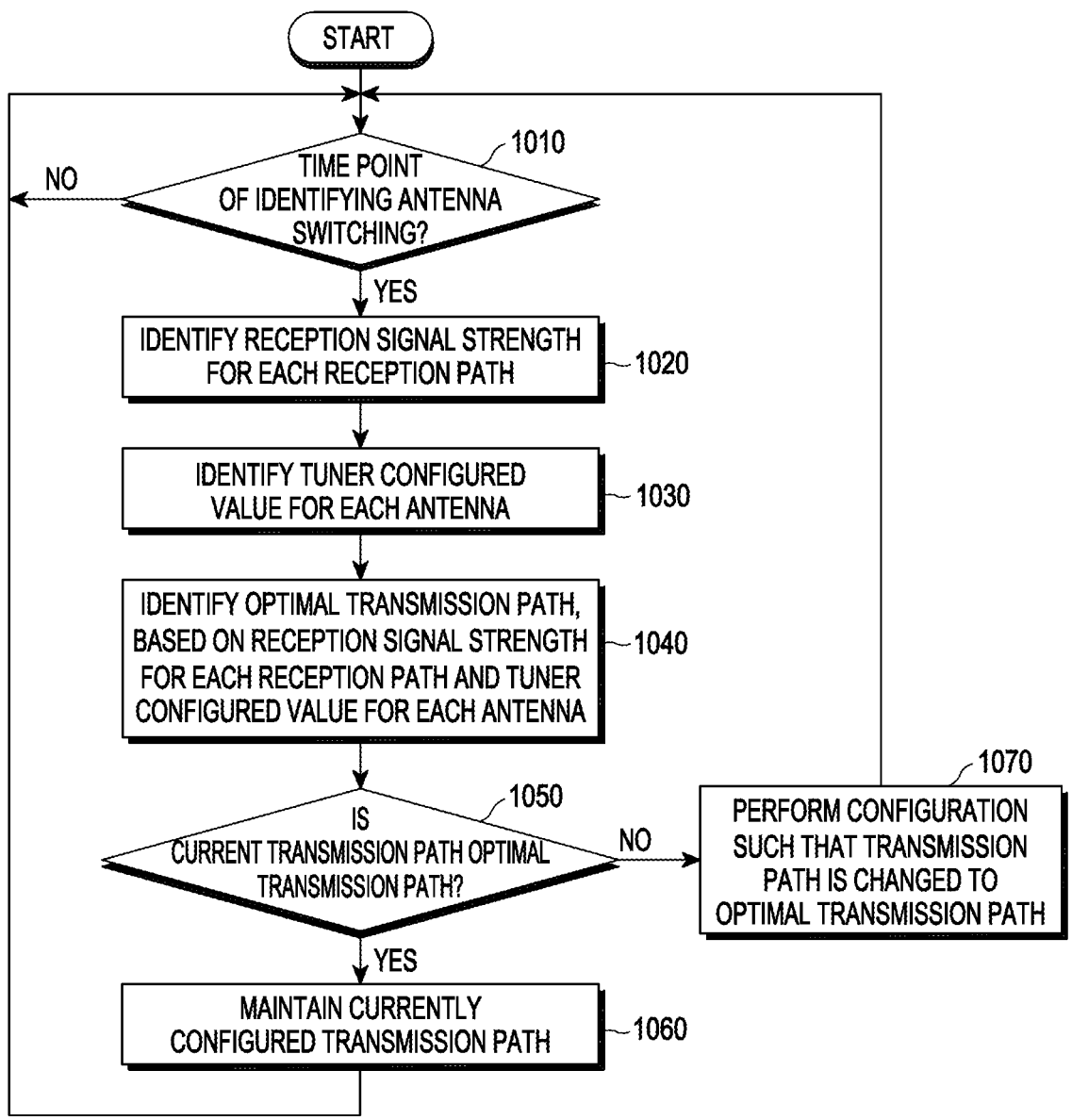
FIG. 10 is a flowchart illustrating an example method for operating an electronic device according to various embodiments.
Figure 11:
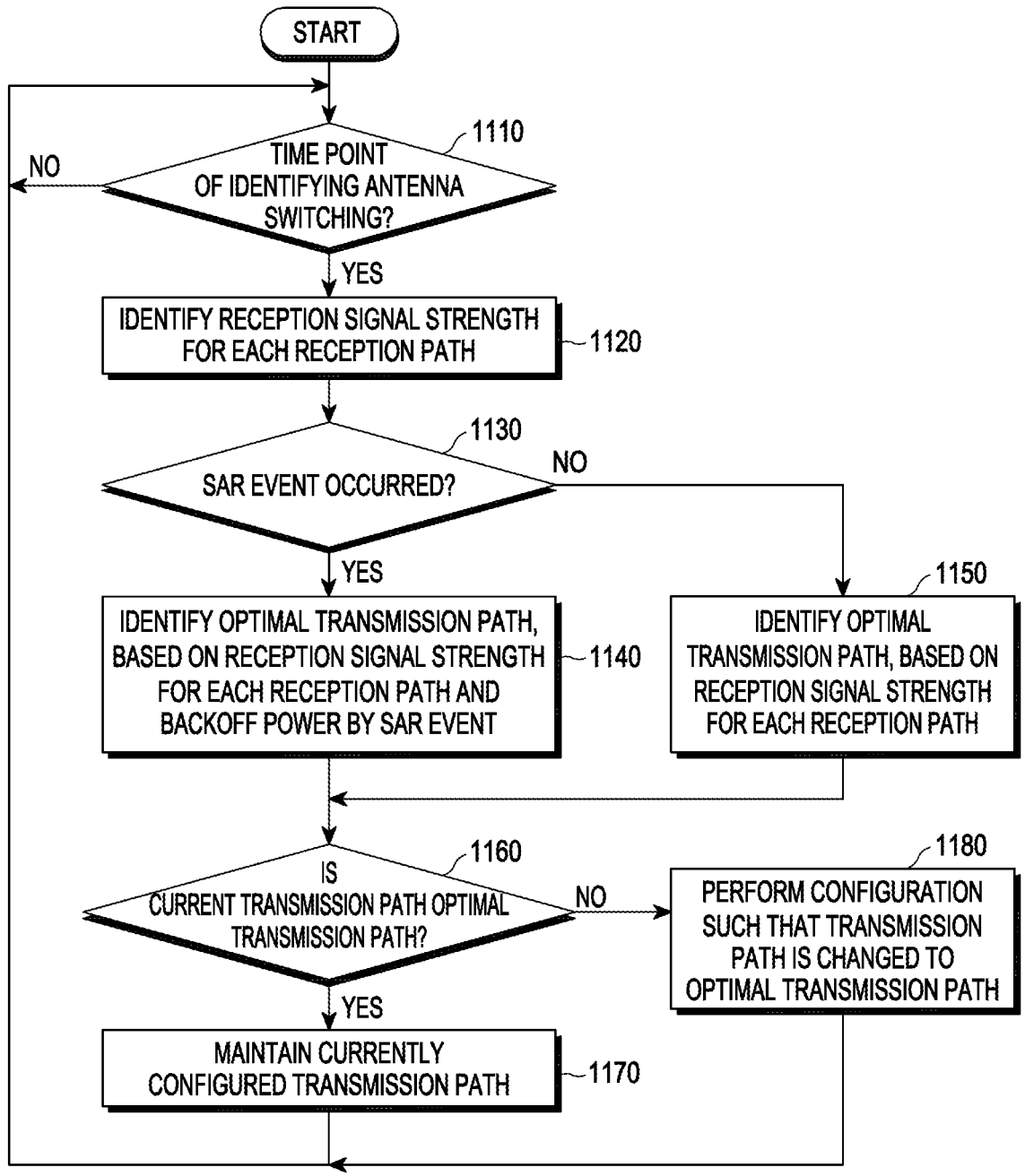
FIG. 11 is a flowchart illustrating an example method for operating an electronic device according to various embodiments.

FIGS. 9, 10, and 11 are flowcharts illustrating example methods for operating an electronic device according to various embodiments. The operations of FIG. 9, 10, or 11 described below may, for example, and without limitation, be applied to an electronic device of FIGS. 4A, 4B, 4C, 4D, 4E, 6, or 7.

FIG. 9 is a flowchart illustrating an example method for operating an electronic device according to various embodiments. An electronic device (e.g., the electronic device 101 in FIG. 1) may include a communication processor 260, at least one radio frequency integrated circuit (RFIC) 410 connected to the communication processor, and a plurality of antennas 441, 442, 443, 444, 445, 661, 662, 663, 664, each of which is connected to at least one RFIC through at least one radio frequency front-end (RFFE) circuit 431, 432, 433, 631, 632 to transmit a corresponding signal to at least one communication network.

Referring to FIG. 9, according to various embodiments, every configured time period (e.g., 640 ms) or when a specific event occurs (e.g., a case in which a SAR event occurs or an electric field situation rapidly changes, or signaling of a base station), the electronic device 101 (e.g., the communication processor 260 of an electronic device) may identify whether the transmission path of a transmission signal is changed (or whether an antenna is switched). For example, in operation 910, when a time point of identifying whether a transmission path is changed (e.g., at a time point of identifying antenna switching) has arrived (910—Yes), the electronic device 101 may identify reception signal strength for each reception path in operation 920. For example, the electronic device 101 (e.g., the communication processor 260) may identity information (e.g., reference signal received power (RSRP), received strength signal indicator (RSSI), reference signal received quality (RSRQ), received signal code power (RSCP), signal to noise ratio (SNR), or signal to interference plus noise radio (SINR)) related to the reception signal strength for each reception path. According to various embodiments, the electronic device 101 may determine whether to change a transmission path, based on at least the strength difference between the reception signals.

According to various embodiments, the electronic device 101 may identify maximum transmittable power for each transmission path in operation 930. As described above in FIG. 8, the maximum transmittable power for each transmission path may be configured in consideration of at least one of SAR event maximum transmittable power (SAR EVENT MAX Power) configured in response to each SAR event, in consideration of the maximum transmittable power (P-MAX Power (PeMax)) received from each communication network (e.g., a base station), the maximum transmittable power (UE Tx MAX Power (PcMax)) for each transmission path configured in the electronic device 101, and/or specific absorption rate (SAR) backoff. For example, the maximum transmittable power may be determined as a minimum value among the plurality of maximum transmittable powers (e.g., P-MAX Power, UE Tx MAX Power, SAR EVENT MAX Power) mentioned above, but is not limited thereto.

According to various embodiments, in operation 940, the electronic device 101 may identify an optimal transmission path, based on the reception signal strength for each reception path and the maximum transmittable power for each transmission path. For example, the electronic device 101 may determine an optimal transmission path by calculating a strength difference between reception signals for a plurality of reception paths and a difference in maximum transmittable power for each transmission path. Since various embodiments of determining an optimal transmission path, based on the reception signal strength for each reception path and a maximum transmittable power for each transmission path have been described in detail in the description of FIG. 4A, detailed descriptions thereof may not be repeated.

According to various embodiments, when the optimal transmission path identified in operation 950 is the current transmission path (950—yes), the electronic device 101 may maintain the currently configured transmission path in operation 960. When the optimal transmission path identified in operation 950 is not the current transmission path (950—No), the electronic device 101 may perform configuration such that the currently configured transmission path is changed to the identified optimal transmission path in operation 970. For example, the electronic device 101 may configure a transmission path of a transmission signal to an optimal transmission path by controlling an RFIC (e.g., the RFIC 410 in FIG. 4A) or a switch (e.g., the switch 450 in FIG. 4A).

When the identification of an optimal transmission path and the change of a transmission path are completed, the electronic device may identify again in operation 910 whether the antenna switching identification time has arrived. According to the above operation, the electronic device 101 may identify every configured period (e.g., 640 ms) whether a transmission path of a transmission signal has been changed.

FIG. 10 is a flowchart illustrating an example method for operating an electronic device according to various embodiments. An electronic device (e.g., the electronic device 101 in FIG. 1) may include a communication processor 260, at least one radio frequency integrated circuit (RFIC) 410 connected to the communication processor, and a plurality of antennas 441, 442, 443, 444, 445, 661, 662, 663, 664, each of which is connected to the at least one RFIC through at least one radio frequency front-end (RFFE) circuit 431, 432, 433, 631, 632 to transmit a corresponding signal to at least one communication network.

Referring to FIG. 10, according to various embodiments, every configured time period (e.g., 640 ms) or when a specific event occurs (e.g., a case in which a SAR event occurs or an electric field situation rapidly changes, or signaling of a base station), the electronic device 101 (e.g., the communication processor 260 of an electronic device) may identify whether the transmission path of a transmission signal is changed (or whether an antenna is switched). For example, in operation 1010, when a time point of identifying whether a transmission path is changed (e.g., at a time point of identifying antenna switching) has arrived (1010—Yes), the electronic device 101 may identify reception signal strength for each reception path in operation 1020. For example, the electronic device 101 (e.g., the communication processor 260) may identity information (e.g., reference signal received power (RSRP), received strength signal indicator (RSSI), reference signal received quality (RSRQ), received signal code power (RSCP), signal to noise ratio (SNR), or signal to interference plus noise radio (SINR)) related to the reception signal strength for each reception path. According to various embodiments, the electronic device 101 may determine whether to change a transmission path, based on at least the strength difference between the reception signals.

According to various embodiments, the electronic device 101 may identify a tuner configured value for each antenna in operation 1030. For example, the electronic device 101 may identify a tuner configured value configured for an antenna corresponding to a current transmission path. According to various embodiments, the tuner configured value configured for the antenna may be determined according to a configuration related to an imbalance state between a transmission signal and a reception signal or a specific antenna tuner configuration mode (e.g., a transmission-only mode, reception-only mode, transmission/reception balance mode). The electronic device 101 may identify a transmission/reception imbalance value according to the tuner configured value.

According to various embodiments, in operation 1040, the electronic device 101 may determine an optimal transmission path, based on a transmission/reception imbalance value determined according to the reception signal strength for each reception path and the tuner configured value for each antenna. For example, the electronic device 101 may determine an optimal transmission path by calculating the strength difference between reception signals for a plurality of reception paths and a transmission/reception imbalance value. Since various embodiments of determining an optimal transmission path, based on the reception signal strength for each reception path and a transmission/reception imbalance value have been described in detail in the description of FIG. 4A, a detailed description thereof may not be repeated.

According to various embodiments, when the optimal transmission path identified in operation 1050 is a current transmission path (1050—Yes), the electronic device 101 may maintain the currently configured transmission path in operation 1060. When the identified optimal transmission path is not the current transmission path (1050—No) in operation 1050, the electronic device 101 may perform configuration such that the currently configured transmission path is changed to the identified optimal transmission path in operation 1070. For example, the electronic device 101 may configure a transmission path of a transmission signal to an optimal transmission path by controlling an RFIC (e.g., the RFIC 410 in FIG. 4A) or a switch (e.g., the switch 450 in FIG. 4A).

When the identification of an optimal transmission path and the change of a transmission path are completed, the electronic device may identify again in operation 1010 whether the antenna switching identification time has arrived. According to the above operation, the electronic device 101 may identify every configured period (e.g., 640 ms) whether a transmission path of a transmission signal has been changed.

FIG. 11 is a flowchart illustrating an example method for operating an electronic device according to various embodiments. An electronic device (e.g., the electronic device 101 in FIG. 1) may include a communication processor 260, at least one radio frequency integrated circuit (RFIC) 410 connected to the communication processor, and a plurality of antennas 441, 442, 443, 444, 445, 661, 662, 663, 664, each of which is connected to the at least one RFIC through at least one radio frequency front-end (RFFE) circuit 431, 432, 433, 631, 632 to transmit a corresponding signal to at least one communication network.

Referring to FIG. 11, according to various embodiments, every configured time period (e.g., 640 ms) or when a specific event occurs (e.g., a case in which a SAR event occurs or an electric field situation rapidly changes, or signaling of a base station), the electronic device 101 (e.g., the communication processor 260 of an electronic device) may identify whether the transmission path of a transmission signal is changed (or whether an antenna is switched). For example, in operation 1110, when a time point of identifying whether a transmission path is changed (e.g., at a time point of identifying antenna switching) has arrived (1110—Yes), the electronic device 101 may identify reception signal strength for each reception path in operation 1020. For example, the electronic device 101 (e.g., the communication processor 260) may identity information (e.g., reference signal received power (RSRP), received strength signal indicator (RSSI), reference signal received quality (RSRQ), received signal code power (RSCP), signal to noise ratio (SNR), or signal to interference plus noise radio (SINR)) related to the reception signal strength for each reception path. According to various embodiments, the electronic device 101 may determine whether to change a transmission path, based on at least the strength difference between the reception signal.

According to various embodiments, the electronic device 101 may identify in operation 1130 whether a SAR event has occurred. For example, the electronic device 101 may identify a SAR event such as a grip event or a proximity event using, for example, a touch sensor or a proximity sensor.

According to various embodiments, when the electronic device 101 determines that a SAR event has occurred in operation 1130 (1130—yes), the electronic device 101 may identify an optimal transmission path in operation 1140, based on the reception signal strength for each reception path and the SAR backoff power by the SAR event. For example, the electronic device 101 may determine an optimal transmission path by calculating a maximum transmittable power reflecting the strength difference between reception signals for a plurality of reception paths and a SAR backoff for each transmission path. According to various embodiments, when the electronic device 101 determines that no SAR event has occurred in operation 1130 (1130—No), the electronic device 101 may identify an optimal transmission path, based on the reception signal strength for each reception path in operation 1150. The operation of identifying that the SAR event has occurred has been described as being performed after identifying the signal strength, but a SAR event occurred before identifying the signal strength is not excluded.

According to various embodiments, when the optimal transmission path identified in operation 1160 is a current transmission path (1160—Yes), the electronic device 101 may maintain the currently configured transmission path in operation 1170. When the identified optimal transmission path is not the current transmission path (1160—No) in operation 1160, the electronic device 101 may perform configuration such that the currently configured transmission path is changed to the identified optimal transmission path in operation 1180. For example, the electronic device 101 may configure a transmission path of a transmission signal to an optimal transmission path by controlling an RFIC (e.g., the RFIC 410 in FIG. 4A) or a switch (e.g., the switch 450 in FIG. 4A).

When the identification of an optimal transmission path and the change of a transmission path are completed, the electronic device may identify again in operation 1010 whether the antenna switching identification time has arrived. According to the above operation, the electronic device 101 may identify every configured period (e.g., 640 ms) whether a transmission path of a transmission signal has been changed.

An electronic device according to various example embodiments may include: a communication processor, at least one radio frequency integrated circuit (RFIC) connected to the communication processor, and a plurality of antennas, each of which is connected to the at least one RFIC through at least one radio frequency front-end (RFFE) circuit and configured to transmit a signal corresponding to at least one communication network, wherein the communication processor is configured to: identify information related to strength of a reception signal received through each of the plurality of antennas, identify maximum transmittable power set corresponding to a transmission path for each of the plurality of antennas, and control the electronic device to transmit a transmission signal through at least one antenna among the plurality of antennas, wherein the at least one antenna is selected at least based on the identified information related to the strength of the reception signal and the maximum transmittable power.

According to various example embodiments, the maximum transmittable power may be determined based on at least one of maximum transmission power set for each transmission path of the electronic device, maximum transmission power received from a base station, or maximum transmission power based on a specific absorption rate (SAR) backoff event.

According to various example embodiments, the maximum transmission power set for each transmission path of the electronic device may be determined further based on additional maximum power reduction (A-MPR) or maximum power reduction (MPR) configured according to a modulation scheme and/or a resource block (RB).

According to various example embodiments, the electronic device may include: at least one switch configured to change transmission paths corresponding to the plurality of antennas, wherein the communication processor is configured to control the at least one switch to control the transmission path of the transmission signal, and the information related to the strength of the reception signal may include one selected from among: reference signal received power (RSRP), received strength signal indicator (RSSI), reference signal received quality (RSRQ), received signal code power (RSCP), signal to noise ratio (SNR), or signal to interference plus noise ratio (SINR).

According to various example embodiments, the communication processor may be configured to identify a configured value of an antenna tuning circuit corresponding to an antenna transmitting a transmission signal among the plurality of antennas, and control the electronic device to transmit a transmission signal through at least one antenna selected further based on the identified configured value of the antenna tuning circuit.

According to various example embodiments, the communication processor may be configured to: identify whether a specific absorption rate (SAR) backoff event has occurred, and based on occurrence of the SAR backoff event being identified, configure at least one transmission path through which a transmission signal is to be transmitted, among plurality of transmission paths, further based on power corresponding to the SAR backoff event.

An electronic device according to various example embodiments may include: a communication processor, at least one radio frequency integrated circuit (RFIC) connected to the communication processor, and a plurality of antennas, each of which is connected to the at least one RFIC through at least one radio frequency front-end (RFFE) circuit and configured to transmit a signal corresponding to at least one communication network, wherein the communication processor is configured to: identify information related to strength of a reception signal received through each of the plurality of antennas, identify a configured value of an antenna tuning circuit corresponding to an antenna transmitting a transmission signal among the plurality of antennas, and control the electronic device to transmit a transmission signal through at least one antenna selected at least based on the identified information related to the strength of the reception signal and the identified configured value of the antenna tuning circuit.

According to various example embodiments, the configured value of the antenna tuning circuit may be based on a configuration related to an imbalance state between the transmission signal and the reception signal.

According to various example embodiments, the configuration related to the imbalance state may include one selected from among a transmission-only configuration, a reception-only configuration, or a transmission/reception balanced configuration.

According to various example embodiments, the electronic device may include at least one switch configured to change transmission paths corresponding to the plurality of antennas, wherein the communication processor is configured to control the at least one switch to control a transmission path of the transmission signal.

According to various example embodiments, the information related to the strength of the reception signal may include one selected from among reference signal received power (RSRP), received strength signal indicator (RSSI), reference signal received quality (RSRQ), received signal code power (RSCP), signal to noise ratio (SNR), or signal to interference plus noise ratio (SINR).

According to various example embodiments, the communication processor may be configured to identify whether a specific absorption rate (SAR) backoff event has occurred, and based on occurrence of the SAR backoff event being identified, configure at least one transmission path through which a transmission signal is to be transmitted, among plurality of transmission paths, further based on power corresponding to the SAR backoff event.

According to various example embodiments, a method for configuring a transmission path by an electronic device, the method including: identifying information related to strength of a reception signal received through each of plurality of antennas, wherein the electronic device includes a communication processor, at least one radio frequency integrated circuit (RFIC) connected to the communication processor, and a plurality of antennas, each of which is connected to the at least one RFIC through at least one radio frequency front-end (RFFE) circuit and configured to transmit a signal corresponding to at least one communication network, identifying maximum transmittable power set corresponding to a transmission path for each of the plurality of antennas, and transmitting a transmission signal through at least one antenna among the plurality of antennas, wherein the at least one antenna is selected at least based on the identified information related to the strength of the reception signal and the maximum transmittable power.

According to various example embodiments, the maximum transmittable power may be determined based on at least one of maximum transmission power set for each transmission path of the electronic device, maximum transmission power received from a base station, or maximum transmission power considering a specific absorption rate (SAR) backoff event.

According to various example embodiments, the maximum transmission power set for each transmission path of the electronic device may be determined further based on additional maximum power reduction (A-MPR) or maximum power reduction (MPR) configured according to a modulation scheme and/or a resource block (RB).

According to various example embodiments, the method may control a transmission path of a transmission signal by controlling at least one switch of the electronic device.

According to various example embodiments, the information related to the strength of the reception signal may include one selected from among reference signal received power (RSRP), received strength signal indicator (RSSI), reference signal received quality (RSRQ), received signal code power (RSCP), signal to noise ratio (SNR), or signal to interference plus noise ratio (SINR).

According to various example embodiments, the method may further include: identifying a configured value of an antenna tuning circuit corresponding to an antenna transmitting a transmission signal among the plurality of antennas, and transmitting a transmission signal through at least one antenna selected further based on the identified configured value of the antenna tuning circuit.

According to various example embodiments, the method may further include: identifying whether a specific absorption rate (SAR) backoff event has occurred, and based on occurrence of the SAR backoff event being identified, configuring at least one transmission path through which a transmission signal is to be transmitted, among plurality of transmission paths, further based on power corresponding to the SAR backoff event.

The electronic device according to various embodiments may be one of various types of electronic devices. The electronic devices may include, for example, a computer device, a portable communication device (e.g., a smartphone), a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art, that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   memory storing instructions;
   at least one processor including processing circuitry;
   at least one radio frequency integrated circuit (RFIC);
   a plurality of antennas including a first antenna and a second antenna, wherein the first antenna is connected to the at least one RFIC through a first signal path and the second antenna is connected to the at least one RFIC through a second signal path different from the first signal path,
   wherein the instructions, when executed by the at least one processor, cause the electronic device to:
   identify a strength of a first reception signal received through the first antenna over the first signal path,
   identify a strength of a second reception signal received through the second antenna over the second signal path,
   identify a first maximum transmittable power set corresponding to a first transmission signal to be sent over the first signal path for transmission by the first antenna,
   identify a second maximum transmittable power set corresponding to a second transmission signal to be sent over the second signal path for transmission by the second antenna,
   select a transmission path as one of the first signal path and the second signal path, based on the strength of the first reception signal, the strength of a second reception signal, the first maximum transmittable power, and the second maximum transmittable power, and
   transmit a transmission signal over the first signal path through the first antenna or over the second signal path through the second antenna that corresponds to the selected transmission path.

2. The electronic device of claim 1, wherein each of the first maximum transmittable power and the second maximum transmittable power is determined based on at least one of maximum transmission power set for each signal path of the electronic device, maximum transmission power received from a base station, or maximum transmission power based on a specific absorption rate (SAR) backoff event.

3. The electronic device of claim 2, wherein each of the first maximum transmittable power and the second maximum transmittable power is determined further based on additional maximum power reduction (A-MPR) or maximum power reduction (MPR) configured according to a modulation scheme and/or a resource block (RB).

4. The electronic device of claim 1, further comprising at least one switch configured to change signal,
   wherein the instructions, when executed by the at least one processor, cause the electronic device to control the at least one switch to connect the selected transmission path.

5. The electronic device of claim 1, wherein the strength of the first reception signal and the strength of the second reception signal are selected from among reference signal received power (RSRP), received strength signal indicator (RSSI), reference signal received quality (RSRQ), received signal code power (RSCP), signal to noise ratio (SNR), or signal to interference plus noise ratio (SINR).

6. The electronic device of claim 1, wherein the instructions, when executed by the at least one processor, cause the electronic device to:
   identify a first configured value of a first antenna tuning circuit corresponding to the first antenna,
   identify a second configured value of a second antenna tuning circuit corresponding to the second antenna, and
   select the transmission path further based on the first configured value and the second configured value.

7. The electronic device of claim 1, wherein the instructions, when executed by the at least one processor, cause the electronic device to:
   identify whether a specific absorption rate (SAR) backoff event has occurred, and
   based on occurrence of the SAR backoff event being identified, configure the selected transmission path based on power corresponding to the SAR backoff event.

8. An electronic device comprising:
   memory storing instructions;
   at least one processor including processing circuitry;
   at least one radio frequency integrated circuit (RFIC);
   a plurality of antennas including a first antenna and a second antenna, wherein the first antenna is connected to the at least one RFIC through a first signal path and the second antenna is connected to the at least one RFIC through a second signal path different from the first signal path,
   wherein the instructions, when executed by the at least one processor, cause the electronic device to:
   identify a strength of a first reception signal received through the first antenna over the first signal path,
   identify a strength of a second reception signal received through the second antenna over the second signal path,
   identify a first configured value of a first antenna tuning circuit corresponding to the first antenna,
   identify a second configured value of a second antenna tuning circuit corresponding to the second antenna,
   select a transmission path as one of the first signal path and the second signal path, based on the strength of the first reception signal, the strength of a second reception signal, the first configured value of the first antenna tuning circuit, and the second configured value of the second antenna tuning circuit, and
   transmit a transmission signal over the first signal path through the first antenna or over the second signal path through the second antenna that corresponds to the selected transmission path.

9. The electronic device of claim 8, wherein the first configured value of the first antenna tuning circuit is based on a configuration related to an imbalance state between the first transmission signal and the first reception signal and the second configured value of the second antenna tuning circuit is based on a configuration related to an imbalance state between the second transmission signal and the second reception signal.

10. The electronic device of claim 9, wherein the configuration related to the imbalance state comprises one selected from among a transmission-only configuration, a reception-only configuration, or a transmission/reception balanced configuration.

11. The electronic device of claim 8, comprising at least one switch configured to change signal paths,
wherein the instructions, when executed by the at least one processor, cause the electronic device to control the at least one switch to connect the selected transmission path.

12. The electronic device of claim 8, wherein the strength of the first reception signal and the strength of the second reception signal are selected from among reference signal received power (RSRP), received strength signal indicator (RSSI), reference signal received quality (RSRQ), received signal code power (RSCP), signal to noise ratio (SNR), or signal to interference plus noise ratio (SINR).

13. The electronic device of claim 8, wherein the instructions, when executed by the at least one processor, cause the electronic device to:
identify whether a specific absorption rate (SAR) backoff event has occurred, and
based on occurrence of the SAR backoff event being identified, configure the selected transmission path based on power corresponding to the SAR backoff event.

14. A method for an electronic device that includes a first antenna and a second antenna, wherein the first antenna is connected to the at least one radio frequency integrated circuit (RFIC) through a first signal path and the second antenna is connected to the at least one RFIC through a second signal path different from the first signal path, the method comprising:
identify a strength of a first reception signal received through the first antenna over the first signal path,
identify a strength of a second reception signal received through the second antenna over the second signal path,
identify a first maximum transmittable power set corresponding to a first transmission signal to be sent over the first signal path for transmission by the first antenna,
identify a second maximum transmittable power set corresponding to a second transmission signal to be sent over the second signal path for transmission by the second antenna,
select a transmission path as one of the first signal path and the second signal path, based on the strength of the first reception signal, the strength of a second reception signal, the first maximum transmittable power, and the second maximum transmittable power, and
transmit a transmission signal over the first signal path through the first antenna or over the second signal path through the second antenna that corresponds to the selected transmission path.

15. The method of claim 14, wherein each of the first maximum transmittable power and the second maximum transmittable power is determined based on at least one of maximum transmission power set for each signal path of the electronic device, maximum transmission power received from a base station, or maximum transmission power based on a specific absorption rate (SAR) backoff event.

16. The method of claim 14, wherein each of the first maximum transmittable power and the second maximum transmittable power is determined further based on additional maximum power reduction (A-MPR) or maximum power reduction (MPR) configured according to a modulation scheme and/or a resource block (RB).

17. The method of claim 14, wherein the method further comprises:
controlling at least one switch of the electronic device to connect the selected transmission path of the transmission signal.

18. The method of claim 14, wherein the strength of the first reception signal and the strength of the second reception signal are selected from among reference signal received power (RSRP), received strength signal indicator (RSSI), reference signal received quality (RSRQ), received signal code power (RSCP), signal to noise ratio (SNR), or signal to interference plus noise ratio (SINR).

19. The method of claim 14, wherein the method further comprises:
identifying a first configured value of a first antenna tuning circuit corresponding to the first antenna,
identifying a second configured value of a second antenna tuning circuit corresponding to the second antenna, and
selecting the transmission path further based on the first configured value and the second configured value.

20. The method of claim 14, wherein the method further comprises:
identifying whether a specific absorption rate (SAR) backoff event has occurred, and
configuring, based on occurrence of the SAR backoff event being identified, the selected transmission path based on power corresponding to the SAR backoff event.

* * * * *